US012513627B2

(12) United States Patent
Maamari et al.

(10) Patent No.: US 12,513,627 B2
(45) Date of Patent: Dec. 30, 2025

(54) CONSIDERATIONS FOR COMMUNICATION POWER STATES

(71) Applicant: QUALCOMM Incorporated, San Diego, CA (US)

(72) Inventors: Diana Maamari, San Diego, CA (US); Ahmed Elshafie, San Diego, CA (US); Ahmed Attia Abotabl, San Diego, CA (US); Mickael Mondet, Louannec (FR); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 18/180,817

(22) Filed: Mar. 8, 2023

(65) Prior Publication Data

US 2024/0306096 A1 Sep. 12, 2024

(51) Int. Cl.
*H04W 52/28* (2009.01)
*H04L 5/00* (2006.01)
(Continued)

(52) U.S. Cl.
CPC ............. *H04W 52/28* (2013.01); *H04L 5/001* (2013.01); *H04W 52/54* (2013.01); *H04W 72/1273* (2013.01); *H04W 72/20* (2023.01)

(58) Field of Classification Search
CPC . H04W 52/28; H04W 52/54; H04W 72/1273; H04W 72/20; H04W 76/28;
(Continued)

(56) References Cited

U.S. PATENT DOCUMENTS 8,583,190 B1 * 11/2013 Kopikare ............... H04W 52/52
455/343.1
12,349,071 B2 * 7/2025 Jiang ................. H04W 52/0229
(Continued)

FOREIGN PATENT DOCUMENTS

EP 4080929 A1 10/2022
WO WO-2020083348 A1 4/2020
(Continued)

OTHER PUBLICATIONS

International Search Report and Written Opinion—PCT/US2024/012160—ISA/EPO—May 28, 2024.
(Continued)

*Primary Examiner* — Kan Yuen
(74) *Attorney, Agent, or Firm* — Holland & Hart LLP /Qualcomm

(57) ABSTRACT

Methods, systems, and devices for wireless communications are described. In some wireless communications systems, a user equipment (UE) may receive a control message indicating multiple power states, where each power state of the multiple power states may be associated with a configuration of the UE. Additionally, the UE may transition from a first power state of the multiple power states to a second power state of the multiple power states based on a condition being satisfied. In such cases, a first configuration of the UE associated with the first power state may be different than a second configuration of the UE associated with the second power state.

29 Claims, 13 Drawing Sheets

(51) Int. Cl.
  *H04W 52/54* (2009.01)
  *H04W 72/1273* (2023.01)
  *H04W 72/20* (2023.01)

(58) Field of Classification Search
  CPC ........... H04W 52/0235; H04W 52/028; H04W 52/0216; H04L 5/001; Y02D 30/70
  See application file for complete search history.

(56) References Cited

U.S. PATENT DOCUMENTS

| | | | | |
|---|---|---|---|---|
| 2012/0026963 | A1* | 2/2012 | Kim | H04L 1/1896 370/329 |
| 2014/0185467 | A1* | 7/2014 | Heo | H04W 72/04 370/252 |
| 2014/0269459 | A1* | 9/2014 | Fan | H04W 36/087 370/294 |
| 2019/0090299 | A1 | 3/2019 | Ang et al. | |
| 2019/0281504 | A1 | 9/2019 | Su et al. | |
| 2020/0029316 | A1 | 1/2020 | Zhou et al. | |
| 2020/0037248 | A1 | 1/2020 | Zhou et al. | |
| 2020/0112917 | A1 | 4/2020 | Nam et al. | |
| 2020/0260304 | A1 | 8/2020 | Zhou et al. | |
| 2020/0274750 | A1 | 8/2020 | Yi et al. | |
| 2020/0314747 | A1 | 10/2020 | Zhou et al. | |
| 2021/0021397 | A1 | 1/2021 | Kim et al. | |
| 2021/0037592 | A1 | 2/2021 | Lee et al. | |
| 2021/0160898 | A1* | 5/2021 | Luo | H04W 52/386 |
| 2021/0185693 | A1* | 6/2021 | Takeda | H04W 72/0446 |
| 2021/0298114 | A1 | 9/2021 | Nam et al. | |
| 2021/0321446 | A1 | 10/2021 | Lee et al. | |
| 2021/0336755 | A1 | 10/2021 | Xiao et al. | |
| 2021/0377866 | A1* | 12/2021 | Kim | H04W 52/0251 |
| 2022/0078707 | A1* | 3/2022 | Zhou | H04W 52/0216 |
| 2022/0167279 | A1 | 5/2022 | Zhou et al. | |
| 2022/0330153 | A1 | 10/2022 | Hande | |
| 2022/0394671 | A1 | 12/2022 | Zhang et al. | |
| 2023/0020254 | A1* | 1/2023 | Ly | H04W 76/28 |
| 2023/0039103 | A1* | 2/2023 | Khoshnevisan | H04W 52/325 |
| 2023/0199655 | A1* | 6/2023 | Liu | H04W 52/0229 370/311 |
| 2023/0292236 | A1* | 9/2023 | Jiang | H04W 76/27 |

FOREIGN PATENT DOCUMENTS

| | | |
|---|---|---|
| WO | WO-2020204802 A1 | 10/2020 |
| WO | WO-2021067703 A1 | 4/2021 |

OTHER PUBLICATIONS

Liang, et al., "Bandwidth Part Configuration Method and Device", WO, English translation of WO2020083348, Apr. 30, 2020, (Year: 2020).

* cited by examiner

CONSIDERATIONS FOR COMMUNICATION POWER STATES

FIELD OF TECHNOLOGY

The following relates to wireless communications, including considerations for communication power states.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support considerations for communication power states. Generally, the techniques described herein may enable a wireless device, such as a user equipment (UE), to transition between multiple power states, each power state associated with a configuration of the UE. For example, the UE may receive a first control message indicating the multiple power states, where each power state of the multiple power states is associated with a configuration of the UE. In some cases, the UE, operating in accordance with a first configuration associated with a first power state of the multiple power states, may transition from the first power state to a second power state of the multiple power states based on satisfying a condition, where the second power state is associated with a second configuration of the UE. In other words, the UE may switch from the first configuration to the second configuration based on transitioning from the first power state to the second power state. In some examples, the condition may be satisfied based on the UE initiating a retransmission timer, transmitting a negative acknowledgment message for one or more downlink messages, operating in an activation period of the second power state, receiving a burst of downlink messages, receiving a second control message indicating the second power state, expiration of a timer, or any combination thereof.

A method for wireless communications at a UE is described. The method may include receiving a first control message indicating a set of multiple power states, where each power state of the set of multiple power states is associated with a configuration of the UE and transitioning from a first power state of the set of multiple power states to a second power state of the set of multiple power states based on a condition being satisfied, where a first configuration of the UE associated with the first power state is different than a second configuration of the UE associated with the second power state.

An apparatus for wireless communications at a UE is described. The apparatus may include a processor, memory coupled with the processor, and instructions stored in the memory. The instructions may be executable by the processor to cause the apparatus to receive a first control message indicating a set of multiple power states, where each power state of the set of multiple power states is associated with a configuration of the UE and transition from a first power state of the set of multiple power states to a second power state of the set of multiple power states based on a condition being satisfied, where a first configuration of the UE associated with the first power state is different than a second configuration of the UE associated with the second power state.

Another apparatus for wireless communications at a UE is described. The apparatus may include means for receiving a first control message indicating a set of multiple power states, where each power state of the set of multiple power states is associated with a configuration of the UE and means for transitioning from a first power state of the set of multiple power states to a second power state of the set of multiple power states based on a condition being satisfied, where a first configuration of the UE associated with the first power state is different than a second configuration of the UE associated with the second power state.

A non-transitory computer-readable medium storing code for wireless communications at a UE is described. The code may include instructions executable by a processor to receive a first control message indicating a set of multiple power states, where each power state of the set of multiple power states is associated with a configuration of the UE and transition from a first power state of the set of multiple power states to a second power state of the set of multiple power states based on a condition being satisfied, where a first configuration of the UE associated with the first power state is different than a second configuration of the UE associated with the second power state.

In some examples of the method, apparatuses, and non-transitory computer-readable medium described herein, transitioning from the first power state to the second power state may include operations, features, means, or instructions for transitioning from the first power state to the second power state based on initiating a retransmission timer, where satisfying the condition may be based on initiating the retransmission timer.

Some examples of the method, apparatuses, and non-transitory computer-readable medium described herein may further include operations, features, means, or instructions for initiating the retransmission timer may be based on unsuccessfully receiving one or more downlink messages.

In some examples of the method, apparatuses, and non-transitory computer-readable medium described herein, transitioning from the first power state to the second power state may include operations, features, means, or instructions for transitioning from the first power state to the second power state based on transmitting a negative acknowledgment message for one or more downlink messages, where satisfying the condition may be based on transmitting the negative acknowledgment message.

Some examples of the method, apparatuses, and non-transitory computer-readable medium described herein may further include operations, features, means, or instructions for receiving a second control message indicating a periodicity associated with activation periods of the second power state, where satisfying the condition may be based on the UE operating in an activation period of the second power state.

In some examples of the method, apparatuses, and non-transitory computer-readable medium described herein, transitioning from the first power state to the second power state may include operations, features, means, or instructions for transitioning from the first power state to the second power state based on receiving a burst of downlink messages or one or more second control messages scheduling the burst of downlink messages, where satisfying the condition may be based on receiving the end of the burst or receiving the one or more second control messages.

Some examples of the method, apparatuses, and non-transitory computer-readable medium described herein may further include operations, features, means, or instructions for transitioning from the second power state to the first power state based on expiration of a timer, where a duration of the timer may be associated with the first power state.

Some examples of the method, apparatuses, and non-transitory computer-readable medium described herein may further include operations, features, means, or instructions for receiving a second control message indicating the second power state of the set of multiple power states, where satisfying the condition may be based on receiving the second control message.

In some examples of the method, apparatuses, and non-transitory computer-readable medium described herein, the second control message indicates the second power state may be activated for at least a first CC of a set of multiple CCs associated with the UE.

In some examples of the method, apparatuses, and non-transitory computer-readable medium described herein, the second control message may be received via the first CC of the set of multiple CCs.

In some examples of the method, apparatuses, and non-transitory computer-readable medium described herein, the second control message may be received via a second CC of the set of multiple CCs, and the indication of the second power state may be signaled via a carrier index field in the second control message.

In some examples of the method, apparatuses, and non-transitory computer-readable medium described herein, the second control message includes one or more bits indicating whether the second power state may be activated for the set of multiple CCs or may be activated for a subset of the set of multiple CCs, the subset including the at least first CC.

In some examples of the method, apparatuses, and non-transitory computer-readable medium described herein, the second power state may be activated for at least a first CC of a set of multiple CCs associated with the UE and the method, apparatuses, and non-transitory computer-readable medium may include further operations, features, means, or instructions for receiving a second control message indicating associations between the set of multiple power states and the set of multiple CCs, where the second power state may be activated for the at least first CC based on the second power state being associated with the at least first CC.

In some examples of the method, apparatuses, and non-transitory computer-readable medium described herein, the second power state may be associated with a first power state pattern of a set of multiple power state patterns and the method, apparatuses, and non-transitory computer-readable medium may include further operations, features, means, or instructions for activating, deactivating, or making dormant one or more CCs of a set of multiple CCs associated with the UE based on the first power state pattern, where each power state of the set of multiple power states may be associated with one or more CCs of the set of multiple CCs based on a power state pattern from the set of multiple power state patterns.

Some examples of the method, apparatuses, and non-transitory computer-readable medium described herein may further include operations, features, means, or instructions for receiving a second control message indicating the set of multiple power state patterns including at least the first power state pattern.

In some examples of the method, apparatuses, and non-transitory computer-readable medium described herein, each power state pattern of the set of multiple power state patterns indicates respective durations associated with activation of each power state associated with the power state pattern.

Some examples of the method, apparatuses, and non-transitory computer-readable medium described herein may further include operations, features, means, or instructions for transmitting an indication of one or more suggested power state patterns from the set of multiple power state patterns, where the one or more suggested power state patterns includes the first power state pattern.

In some examples of the method, apparatuses, and non-transitory computer-readable medium described herein, the second power state may be activated for a first CC of a set of multiple CCs associated with the UE and the method, apparatuses, and non-transitory computer-readable medium may include further operations, features, means, or instructions for transitioning one or more second CCs of the set of multiple CCs to one or more third power states of the set of multiple power states based on activating the second power state for the first CC.

Some examples of the method, apparatuses, and non-transitory computer-readable medium described herein may further include operations, features, means, or instructions for satisfying the condition may be based on activating the third power state for the second CC.

In some examples of the method, apparatuses, and non-transitory computer-readable medium described herein, the first control message indicates a default power state from the set of multiple power states for each CC of a set of multiple CCs and the second power state may be a default power state for a first CC of the set of multiple CCs.

Some examples of the method, apparatuses, and non-transitory computer-readable medium described herein may further include operations, features, means, or instructions for receiving a second control message indicating a first TDDing pattern from a set of multiple TDDing patterns, where satisfying the condition may be based on receiving the first TDDing pattern.

Some examples of the method, apparatuses, and non-transitory computer-readable medium described herein may further include operations, features, means, or instructions for receiving a third control message indicating the set of multiple TDDing patterns, where each TDDing pattern may be associated with a power state of the UE, and where the first TDDing pattern may be associated with the second power state.

Some examples of the method, apparatuses, and non-transitory computer-readable medium described herein may further include operations, features, means, or instructions for receiving a second control message indicating a first RRM configuration from a set of multiple RRM configurations, where satisfying the condition may be based on receiving the first RRM configuration.

Some examples of the method, apparatuses, and non-transitory computer-readable medium described herein may further include operations, features, means, or instructions for receiving a third control message indicating the set of multiple RRM configurations, where each RRM configuration may be associated with a power state of the UE, and where the first RRM configuration may be associated with the second power state.

Some examples of the method, apparatuses, and non-transitory computer-readable medium described herein may further include operations, features, means, or instructions for satisfying the condition may be based on a buffer of the UE falling below a threshold.

Some examples of the method, apparatuses, and non-transitory computer-readable medium described herein may further include operations, features, means, or instructions for determining one or more CCs of a set of multiple CCs associated with the UE may be inactive based on the buffer of the UE falling below the threshold.

Some examples of the method, apparatuses, and non-transitory computer-readable medium described herein may further include operations, features, means, or instructions for transmitting an indication to deactivate the one or more CCs based on the buffer of the UE falling below the threshold.

Some examples of the method, apparatuses, and non-transitory computer-readable medium described herein may further include operations, features, means, or instructions for deactivating the one or more CCs of the set of multiple CCs based on a timer, where the one or more CCs may be reactivated after expiration of the timer.

Some examples of the method, apparatuses, and non-transitory computer-readable medium described herein may further include operations, features, means, or instructions for switching the first configuration of the UE to the second configuration of the UE based on transitioning from the first power state to the second power state.

A method for wireless communications at a network entity is described. The method may include transmitting a first control message indicating a set of multiple power states, where each power state of the set of multiple power states is associated with a configuration of a UE, transmitting a second control message activating a first power state of the set of multiple power states, and communicating with the UE based on the configuration associated with the first power state.

An apparatus for wireless communications at a network entity is described.

The apparatus may include a processor, memory coupled with the processor, and instructions stored in the memory. The instructions may be executable by the processor to cause the apparatus to transmit a first control message indicating a set of multiple power states, where each power state of the set of multiple power states is associated with a configuration of a UE, transmit a second control message activating a first power state of the set of multiple power states, and communicate with the UE based on the configuration associated with the first power state.

Another apparatus for wireless communications at a network entity is described. The apparatus may include means for transmitting a first control message indicating a set of multiple power states, where each power state of the set of multiple power states is associated with a configuration of a UE, means for transmitting a second control message activating a first power state of the set of multiple power states, and means for communicating with the UE based on the configuration associated with the first power state.

A non-transitory computer-readable medium storing code for wireless communications at a network entity is described. The code may include instructions executable by a processor to transmit a first control message indicating a set of multiple power states, where each power state of the set of multiple power states is associated with a configuration of a UE, transmit a second control message activating a first power state of the set of multiple power states, and communicate with the UE based on the configuration associated with the first power state.

In some examples of the method, apparatuses, and non-transitory computer-readable medium described herein, the second control message indicates the first power state may be activated for at least a first CC of a set of multiple CCs.

In some examples of the method, apparatuses, and non-transitory computer-readable medium described herein, the second control message may be transmitted via the first CC of the set of multiple CCs.

In some examples of the method, apparatuses, and non-transitory computer-readable medium described herein, the second control message may be transmitted via a second CC of the set of multiple CCs, and the indication of the first power state may be signaled via a carrier index field.

In some examples of the method, apparatuses, and non-transitory computer-readable medium described herein, the second control message includes one or more bits indicating whether the first power state may be activated for the set of multiple CCs or may be activated for a subset of the set of multiple CCs, the subset including the at least first CC.

In some examples of the method, apparatuses, and non-transitory computer-readable medium described herein, the first power state may be activated for at least a first CC of a set of multiple CCs and the method, apparatuses, and non-transitory computer-readable medium may include further operations, features, means, or instructions for transmitting a third control message indicating associations between the set of multiple power states and the set of multiple CCs where the first power state may be activated for the at least first CC based on the first power state being associated with the at least first CC.

In some examples of the method, apparatuses, and non-transitory computer-readable medium described herein, the second control message indicates a first power state pattern from a set of multiple power state patterns and the method, apparatuses, and non-transitory computer-readable medium may include further operations, features, means, or instructions for transmitting a third control message indicating a set of multiple power state patterns, where each power state of the set of multiple power states may be associated with one or more CCs of the set of multiple CCs based on a power state pattern from the set of multiple power state patterns, and where the first power state may be associated with the first power state pattern.

In some examples of the method, apparatuses, and non-transitory computer-readable medium described herein, each power state pattern of the set of multiple power state patterns indicates respective durations associated with activation of each power state associated with the power state pattern.

Some examples of the method, apparatuses, and non-transitory computer-readable medium described herein may further include operations, features, means, or instructions for receiving an indication of one or more suggested power state patterns from the set of multiple power state patterns, where the one or more suggested power state patterns includes the first power state pattern.

In some examples of the method, apparatuses, and non-transitory computer-readable medium described herein, the first control message indicates a default power state from the set of multiple power states for each CC of a set of multiple CCs and the first power state may be a default power state for a first CC of the set of multiple CCs.

In some examples of the method, apparatuses, and non-transitory computer-readable medium described herein, the second control message indicates a first TDDing pattern from a set of multiple TDDing patterns and activation of the first power state may be based on the first TDDing pattern.

Some examples of the method, apparatuses, and non-transitory computer-readable medium described herein may further include operations, features, means, or instructions for transmitting a third control message indicating the set of multiple TDDing patterns, where each TDDing pattern may be associated with a power state of the UE, and where the first TDDing pattern may be associated with the first power state.

In some examples of the method, apparatuses, and non-transitory computer-readable medium described herein, the second control message indicates a first RRM configuration from a set of multiple RRM configurations and activation of the first power state may be based on the first RRM configuration.

Some examples of the method, apparatuses, and non-transitory computer-readable medium described herein may further include operations, features, means, or instructions for transmitting a third control message indicating the set of multiple RRM configurations, where each RRM configuration may be associated with a power state of the UE, and where the first RRM configuration may be associated with the first power state.

Some examples of the method, apparatuses, and non-transitory computer-readable medium described herein may further include operations, features, means, or instructions for receiving an indication to deactivate one or more CCs based on a buffer of the UE falling below a threshold.

DETAILED DESCRIPTION

In some wireless communications systems, a wireless device, such as a user equipment (UE), may support an uplink-only low power state. In such cases, the UE may refrain from monitoring for downlink transmissions (e.g., for a physical downlink control channel (PDCCH), a physical downlink shared channel (PDSCH), or both), which may reduce power consumption based on deactivation of hardware components associated with receiving downlink transmissions. In some examples, additional power states may be desired to further reduce power consumption Accordingly, techniques described herein may enable a UE to transition between multiple power states, where each power state is associated with a configuration of the UE. For example, the UE may receive one or more control messages indicating the multiple power states, the configurations associated with each power state of the multiple power states, or both. Accordingly, the UE may transition between power states of the multiple power states based on satisfying a condition. In some examples, the condition may be satisfied based on the UE initiating a retransmission timer, transmitting a negative acknowledgment message for one or more downlink messages, operating in an activation period of the second power state, receiving a burst of downlink messages, receiving a second control message indicating the second power state, expiration of a timer, or any combination thereof. Additionally, or alternatively, each power state of the multiple power states may be associated with one or more component carriers (CCs). That is, the UE may transition to a power state and activate, deactivate, or both, one or more CCs based on the one or more CCs being associated with the power state.

Particular aspects of the subject matter described in this disclosure can be implemented to realize one or more of the following potential advantages. Supporting multiple power states may enable a UE to efficiently transition between configurations of the UE. More specifically, a network entity may tailor communications to the UE based on one or more activated power states which may result in reduced power consumption, more efficient resource utilization, and improved communication reliability. Additionally, the UE may support different power states across multiple CCs, which may enable the UE to support communication diversity across the CCs.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to considerations for communication power states.

Figure 1:
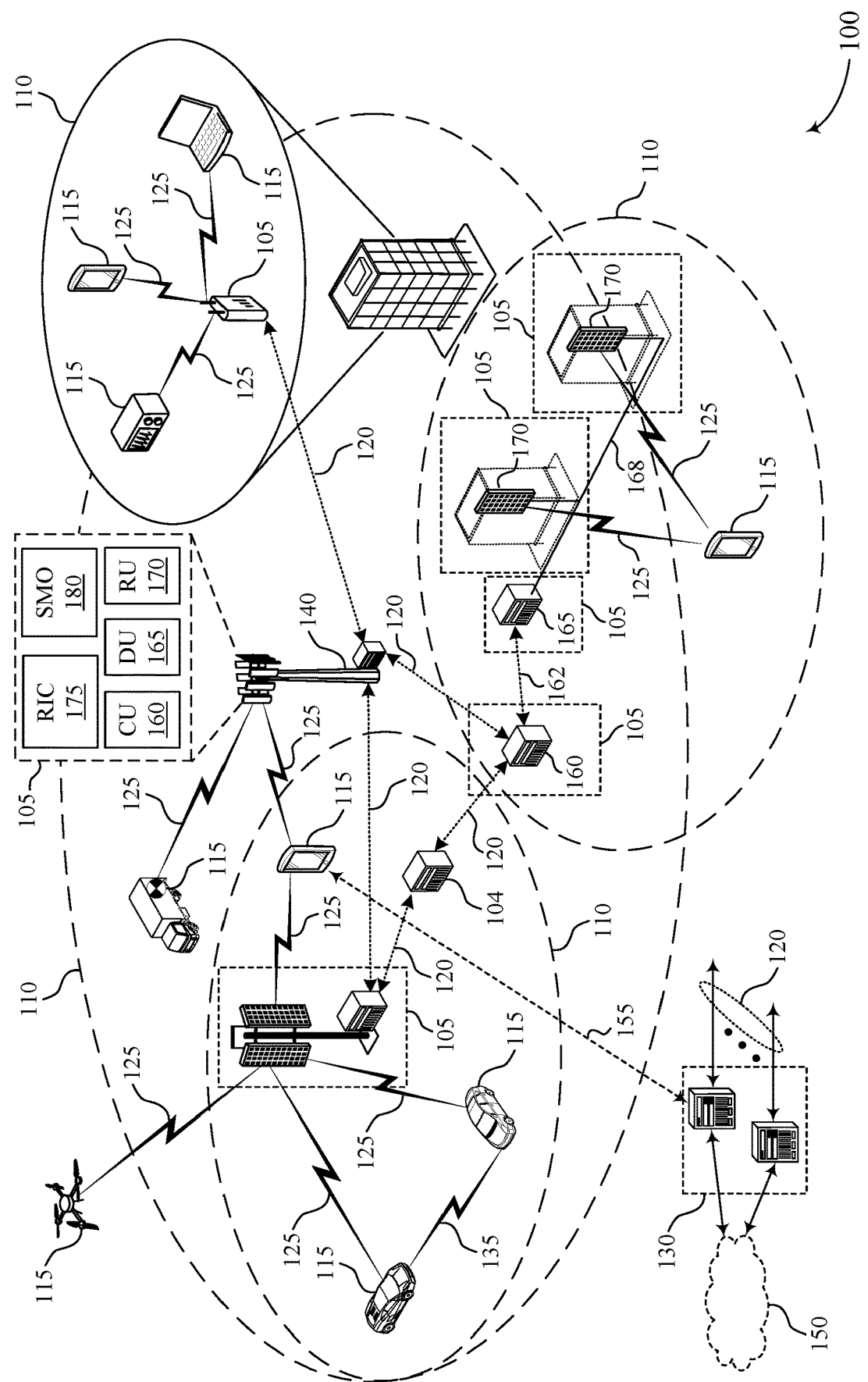
FIG. 1 illustrates an example of a wireless communications system that supports considerations for communication power states in accordance with one or more aspects of the present disclosure.

FIG. 1 illustrates an example of a wireless communications system 100 that supports considerations for communication power states in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support considerations for communication power states as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the wireless communications system 100 may support techniques to enable a UE 115 to transition between multiple power states, where each power state is associated with a configuration of the UE 115. For example, the UE 115 may receive one or more control messages indicating the multiple power states, the configurations associated with each power state of the multiple power states, or both. Accordingly, the UE 115 may transition between power states of the multiple power states based on satisfying a condition. In some examples, the condition may be satisfied based on the UE 115 initiating a retransmission timer, transmitting a negative acknowledgment message for one or more downlink messages, operating in an activation period of the second power state, receiving a burst of downlink messages, receiving a second control message indicating the second power state, expiration of a timer, or any combination thereof. Additionally, or alternatively, each power state of the multiple power states may be associated with one or more CCs. That is, the UE 115 may transition to a power state and activate, deactivate, or both, one or more CCs based on the one or more CCs being associated with the power state.

Figure 2:
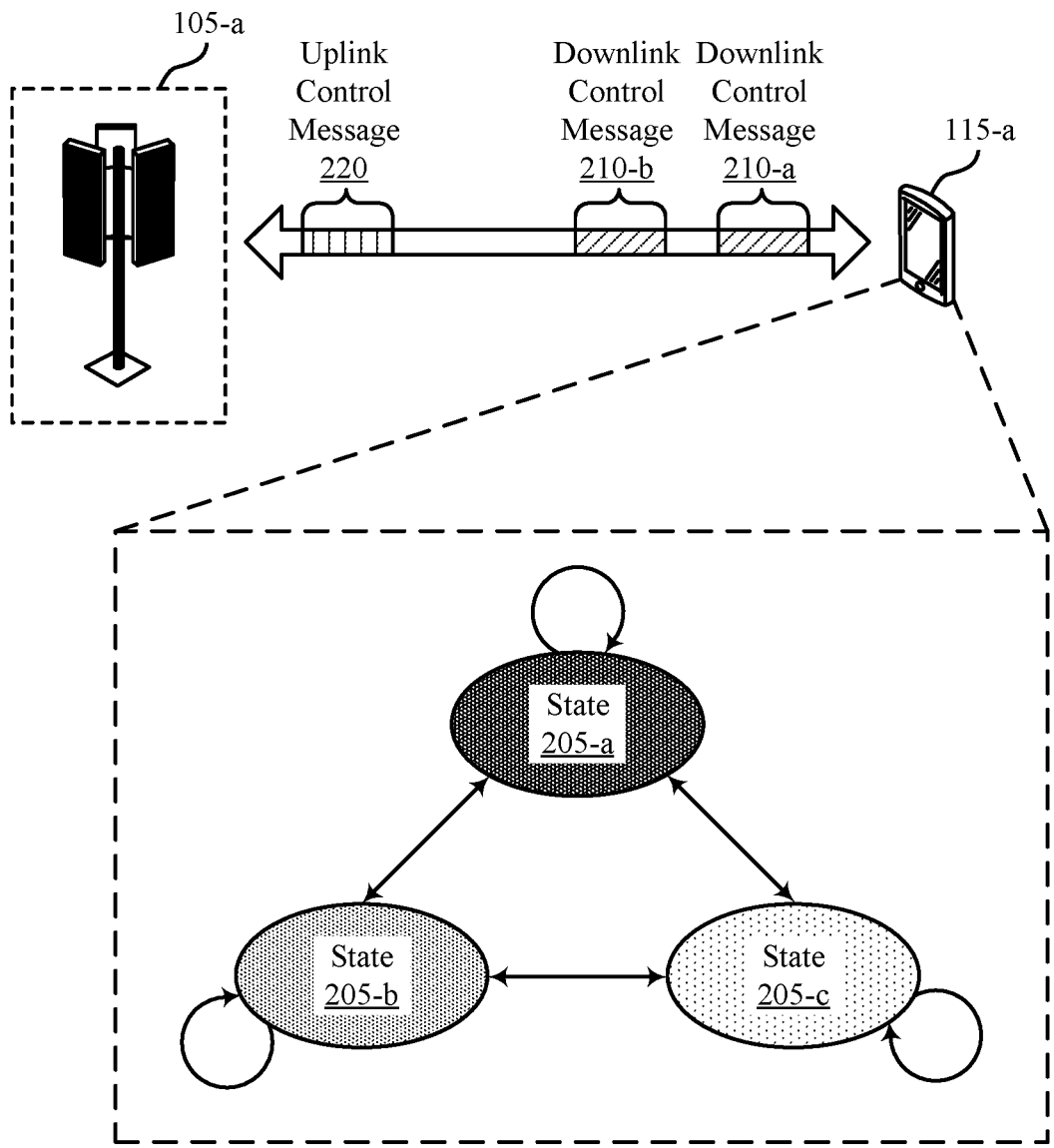
FIG. 2 illustrates an example of a wireless communications system that supports considerations for communication power states in accordance with one or more aspects of the present disclosure.
Figure 2:
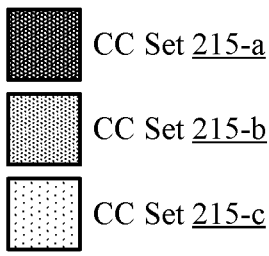

FIG. 2 illustrates an example of a wireless communications system 200 that supports considerations for communication power states in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-a) and one or more UEs 115 (e.g., a UE 115-a), which may be examples of the corresponding devices as described with reference to FIG. 1. The wireless communications system 200 may support transition of the UE 115-a between multiple power states 205, where each power state 205 of the multiple power states 205 is associated with a configuration of the UE 115-b.

In some wireless communications systems, such as the wireless communications system 200, a wireless device, such as the UE 115-a, may support an uplink-only low power state 205. In such cases, the UE 115-a may transmit uplink communications based on receiving one or more configured grants (e.g., uplink configured grants) and may refrain from monitoring for downlink transmissions, such transmissions via a PDCCH, via a PDSCH, or both. Additionally, or alternatively, a bandwidth of a bandwidth part (BWP) associated with a serving cell (e.g., primary cell) of the UE 115-a, such as the network entity 105-a, may matched to (e.g., be the same as) a bandwidth of a BWP associated with uplink traffic (e.g., communications). In some examples, one or more BWPs associated with additional cells (e.g., second cells) of the UE 115-a may be dormant. Additionally, or alternatively, the UE 115-a may receive synchronization signal block (SSB) transmissions, tracking reference signal (TRS) transmissions, or both, such that the UE 115-a may maintain one or more parameters (e.g., physical control loops) at the UE 115-a.

In some examples, the UE 115-a may transition between the uplink-only lower power state 205 and a normal (e.g., high throughput) power state 205 based on a duty cycle, such as a connected mode discontinuous reception (CDRX) duty cycle. In such cases, the UE 115-a may receive a downlink control message 210 indicating one or more timers, such as an active (e.g., "ON") timer, an inactivity timer, or both. The UE 115-a may transition between the uplink-only lower power state 205 and the normal power state 205 based on the one or more timers. In other words, the one or more timers (e.g., duty cycle time) may be indicated (e.g., configured) to enable periodic transitions between the uplink-only lower power state 205 and the normal power state 205. In some examples, the UE 115-a may receive an additional downlink control message 210 (e.g., DCI message) indicating for the UE 115-a to transition from the normal power state 205 to the uplink-only lower power state 205 (e.g., enable faster transition to the uplink-only lower power state 205 as compared to the periodic transitions). Operating in an uplink-only lower power state 205 may enable the UE 115-a to deactivate (e.g., turn off) hardware components associated with receiving downlink transmissions (e.g., PDCCH and PDSCH reception circuits), which may result in reduced power consumption (e.g., as compared to a low power BWP). However, additional power states 205 may be desired to further reduce power consumption.

Accordingly, techniques described herein may enable a UE 115, such as the UE 115-a, to transition between multiple power states 205 (e.g., N power states), where each power state 205 of the multiple power states 205 is associated with a configuration of the UE 115-a. For example, the UE 115-a may receive a downlink control message 210-a indicating the multiple power states 205. The multiple power states 205 may include, but are not limited to, an uplink only-configured grant power state 205, an uplink only-dynamic grant power state 205, a downlink only power state 205, a downlink and uplink power state 205 (e.g., normal power state 205), a modem off power state 205, a downlink semi-persistent scheduling (SPS) power state 205, or any combination thereof. For illustrative purposes, the multiple power states 205 in the context of FIG. 2 may include a power state 205-a, a power state 205-b, and a power state 205-c, which may be any combination of power states 205 described herein.

Additionally, each power state may be associated with a configuration of the UE 115-a. For example, the uplink only-configured grant power state 205 may be associated with a configuration of the UE 115-a in which the UE 115-a refrains from monitoring for downlink transmissions (e.g., via PDDCH and PDSCH), reduces a frequency of retransmissions (e.g., as compared to the uplink and downlink power state 205), may dormant one or more BWPs associated with additional cells (e.g., additional network entities 105) of the UE 115-*a*, and may perform uplink positioning. In another example, the uplink only-dynamic grant power state 205 may be associated with a configuration of the UE 115-*a* in which the UE 115-*a* refrains from monitoring for downlink transmissions associated with scheduling downlink transmissions (e.g., downlink DCI messages) and may monitor a downlink control channel (e.g., PDCCH) for downlink transmissions associated with scheduling uplink transmissions. Additionally, or alternatively, the downlink only power state 205 may be associated with a configuration of the UE 115-*a* in which the UE 115-*a* monitors (e.g., only) for downlink transmissions and refrains from transmitting uplink control messages (e.g., DCI messages). In some examples, the UE 115-*a* may transmit scheduling request (e.g., conditional scheduling requests) while operating in the downlink only power state 205). Additionally, or alternatively, the downlink and uplink power state 205 may be associated with a configuration of the UE 115-*a* in which the UE 115-*a* monitors for both uplink transmissions and downlink transmissions. In another example, the modem off power state 205 may be associated with a configuration of the UE 115-*a* in which the sleeps or idles. Additionally, or alternatively, the downlink SPS power state 205 may be associated with a configuration of the UE 115-*a* in which the UE 115-*a* monitors for transmissions associated with an SPS configuration.

As an illustrative example in the context of FIG. 2, the power state 205-*a* may be associated with a first configuration of the UE 115-*a*, the power state 205-*b* may be associated with a second configuration of the UE 115-*a*, and the power state 205-*c* may be associated with a third configuration of the UE 115-*a*, where the first configuration, the second configuration, and the third configuration are different. As such, each power state 205 (e.g., each configuration) may be associated with a power consumption (e.g., expected power level consumption). For example, the power state 205-*a* may be associated with a first power consumption, the power state 205-*b* may be associated with a second power consumption, and the power state 205-*c* may be associated with a third power consumption, where the first power consumption is greater than the second power consumption and the second power consumption is greater than the third power consumption. In some examples, the downlink control message 210-*a* (e.g., or an additional downlink control message 210) may indicate the configurations associated with the multiple power states 205.

Additionally, the UE 115-*a* may transition between power states 205 (e.g., based on satisfaction of one or more conditions). In some examples, the UE 115-*a* may transition between power states 205 at periodic times. That is, a first power state 205, such as the power state 205-*a*, may be associated with a set of activation periods, where the set of activation periods are associated with a first timer. As such, the UE 115-*a* may transition from a second power state 205, such as the power states 205-*b*, which may be a default power state 205, to the power state 205-*a* based on the UE 115-*a* transitioning to an activation period associated with the power state 205-*a*. As such, the UE 115-*a* may initiate the first timer based on transitioning to the power state 205 during the activation period. Additionally, the UE 115-*a* may transition from the power state 205-*a* to (e.g., back to) the power state 205-*b* based on expiration of the timer. In some examples, the power state 205-*b* may be associated with a second timer such that the UE 115-*a* initiates the second timer based on transitioning to the power state 205-*b* and may transition to the power state 205-*a* (e.g., during an activation period associated with the power state 205-*a*) based on expiration of the second timer. In other words, the UE 115-*a* may transition between power states 205 based on activation periods (e.g., and associated timers) associated with each power state 205 according to a periodic cycle. In some other examples, the UE 115-*a* may transition between power states 205 based on activation periods associated with each power state 205 according to periodicity of uplink traffic, downlink traffic, or both.

Additionally, or alternatively, the UE 115-*a* may transition from the power state 205-*a* to the power state 205-*b* based on transmission of a burst of downlink messages, scheduling of the burst of downlink messages, or both. For example, the UE 115-*a* may receive a downlink control message 210 scheduling a burst of downlink messages. In some examples, the UE 115-*a* may transition from the power state 205-*a* to the power state 205-*b* based on receiving the downlink control message 210 scheduling the burst of downlink messages. Additionally, or alternatively, the UE 115-*a* may receive the burst of downlink messages and may transition from the power state 205-*a* to the power state 205-*b* based on receiving the burst of downlink messages (e.g., transition after or at the end of the burst of downlink messages).

Additionally, or alternatively, the UE 115-*a* may transition from the power state 205-*a* to the power state 205-*b* based on receiving a downlink control message 210-*b* (e.g., DCI message). That is, the downlink control message 210-*b* may indicate for the UE 115-*a* to transition from the power state 205-*a* to the power state 205-*b*. As such, the UE 115-*a* may transition from the power state 205-*a* to the power state 205-*b* based on receiving the downlink control message 210-*b*. In some examples, the downlink control message 210-*b* may indicate activation of a power state 205 for one or more CCs. For example, the downlink control message 210-*b* may indicate for the UE 115-*a* to activate the power state 205-*a* for the one or more CCs. In some examples, the indication of the activation may be via a carrier index field (CIF) (e.g., for cross carrier scheduling). Additionally, or alternatively, the network entity 105-*a* may transmit the downlink control message 210-*b* activating the power state 205 for the one or more CCs via the one or more CCs (e.g., for self-scheduling). In some examples, the downlink control message 210-*b* (e.g., DCI message) may indicate whether an indicated power sate 205 is common (e.g., activated) across the multiple CCs or may be common (e.g., activated) across a subset of the multiple CCs.

Additionally, or alternatively, the UE 115-*a* may transition from the power state 205-*a* to the power state 205-*b* based on initiating a retransmission timer. For example, the UE 115-*a* may fail to receive, fail to decode, or both, one or more downlink messages and may initiate a retransmission timer based on failing to receive, failing to decode, or both the one or more downlink messages. As such, the UE 115-*a* may transition from the power state 205-*a* to the power state 205-*b* based on initiating the retransmission timer.

Additionally, or alternatively, the UE 115-*a* may transition from the power state 205-*a* to the power state 205-*b* based on transmitting one or more negative acknowledgment messages. For example, as described previously, the UE 115-*a* may fail to receive, fail to decode, or both, one or more downlink messages and may transmit one or more negative acknowledgment messages based on failing to receive, failing to decode, or both the one or more downlink messages (e.g., prior to initiating the retransmission timer). As such, the UE 115-*a* may transition from the power state 205-*a* to the power state 205-*b* based on transmitting the one or more negative acknowledgment messages.

In some examples, the UE 115-*a* may transition between power states 205 based on one or more time division duplexing (TDD patterns), one or more radio resource management (RRM) configurations, or both. For example, the UE 115-*a* may receive a downlink control message 210 indicating multiple TDD patterns, multiple RRM configuration, or both, and each TTD pattern, RRM configuration, or both, may be associated with one or more power states 205. For example, a first TTD pattern may be associated with the power state 205-*a* (e.g., the downlink only power state 205), such that the downlink control message 210-*b* may indicate the first TDD pattern and the UE 115-*a* may activate the power state 205-*a* (e.g., and the associated configuration) based on receiving the indication of the first TDD pattern. In another example, a second TDD pattern (e.g., associated with dense uplink slots) may be associated with the power state 205-*b* (e.g., an uplink only power state 205), such that the downlink control message 210-*b* may indicate the second TDD pattern and the UE 115-*a* may activate the power state 205-*b* (e.g., and the associated configuration) based on receiving the indication of the second TDD pattern. Similarly, each RRM configuration of the multiple RRM configurations may be associated with one or more power states 205. In other words, each power state 205 may be associated with an RRM configuration (e.g., with RRM, no RRM, relaxation factor for RRM, measurement gap, etc.), such that the UE 115-*a* may modify a configuration of the UE 115-*a* in accordance with an RRM configuration based on an associated (e.g., and indicated) power state 205.

In some examples, the UE 115-*a* may transition between power states 205 based on a buffer of the UE 115-*a* falling below a threshold. For example, the UE 115-*a* may transition to the power state 205-*a* (e.g., the uplink only-configured grant power state 205) based on the buffer of the UE 115-*a* falling below the threshold. In some examples, the UE 115-*a* may determine that a CC may be dormant or inactive based on the buffer of the UE 115-*a* (e.g., associated with the CC) falling below the threshold. In such cases, the UE 115-*a* may transmit an indication that the CC may be dormant or inactive (e.g., is not needed anymore). Additionally, or alternatively, the UE 115-*a* may dormant the CC based on a timer (e.g., a configured timer). That is, the UE 115-*a* may dormant (e.g., temporarily) the CC for a duration associated with the timer based on the buffer of the UE 115-*a* falling below the threshold.

In some examples, the multiple power states 205 may be associated with multiple CCs (e.g., according to one or more power state pattern). For example, the power state 205-*a* may be associated with a CC set 215-*a* (e.g., based on a first power state pattern), the power state 205-*b* may be associated with a CC set 215-*b* (e.g., based on a second power state pattern), and the power state 205-*c* may be associated with a CC set 215-*c* (e.g., based on a third power state pattern), where each CC set 215 includes one or more CCs (e.g., each associated with a network entity 105). The downlink control message 210-*a* (e.g., or an additional downlink control message 210, RRC message) may indicate associations between the multiple power states 205 and the multiple CCs (e.g., indicate the one or more power state patterns). In some examples, the downlink control message 210-*a* (e.g., or the additional downlink control message 210) may indicate a duration associated with each power state 205 for each CC (e.g., for each power state pattern). That is, the duration may be a time interval for which a power state 205 may be activated for a CC (e.g., for a power state pattern). Additionally, or alternatively, one or more of the CCs of each CC set 215 may be the same or may be different. For example, the CC set 215-*a* may include a CC1, a CC2, and a CC3, the CC set 215-*b* may include the CC1, and the CC set 215-*c* may include a CC0. As such, the UE 115-*a* may activate, deactivate, or both, one or more CCs from the CC sets 215 based on transitioning between power states 205.

For example, the UE 115-*a* may operate according to the power state 205-*a* and may receive the downlink control message 210-*b* indicating the power state 205-*b* (e.g., the second power state pattern). As such, the UE 115-*a* may (e.g., implicitly) deactivate the CC2 and the CC3 based on transitioning to the power state 205-*b* (e.g., rather than including additional bits in the downlink control message 210-*b* indicating the CCs to deactivate).

In some examples, the UE 115-*a* may determine that a current one or more CCs (e.g., one or more CCs activated for the UE 115-*a*) may transition to another power state 205 based on an indicated power state 205. For example, a power state 205 associated with a first CC may be based on a current power state 205 of the first CC and a power state 205 of one or more other CCs. For example, one or more patterns may define association with between CCs and power states 205. That is, a pattern may define that when a first CC, such as the CC1, operates according to a first power state 205, such as the power state 205-*a*, a second CC, such as the CC0, may operate according to a second power state, such as the power state 205-*c*. Additionally, or alternatively, each CC of the multiple CCs associated with the UE 115-*a* may be associated with a default power state 205 (e.g., via preconfiguration or RRC/MAC-CE signaling).

In some examples, the UE 115-*a* may transmit an uplink control message 220 indicating one or more suggested power state patterns. In other words, the UE 115-*a* may transmit the uplink control message 220 indicating a suggested activation or deactivation of one or more power states 205 for one or more CCs associated with the UE 115-*a*. The uplink control message 220 may be a MAC-CE message, an uplink control information (UCI) message, UE assistance information, or any combination thereof.

The UE 115-*a* may transition between power states 205 to increase power savings (e.g., while meeting quality of service (QoS) threshold for a given traffic profile).

Figure 3:
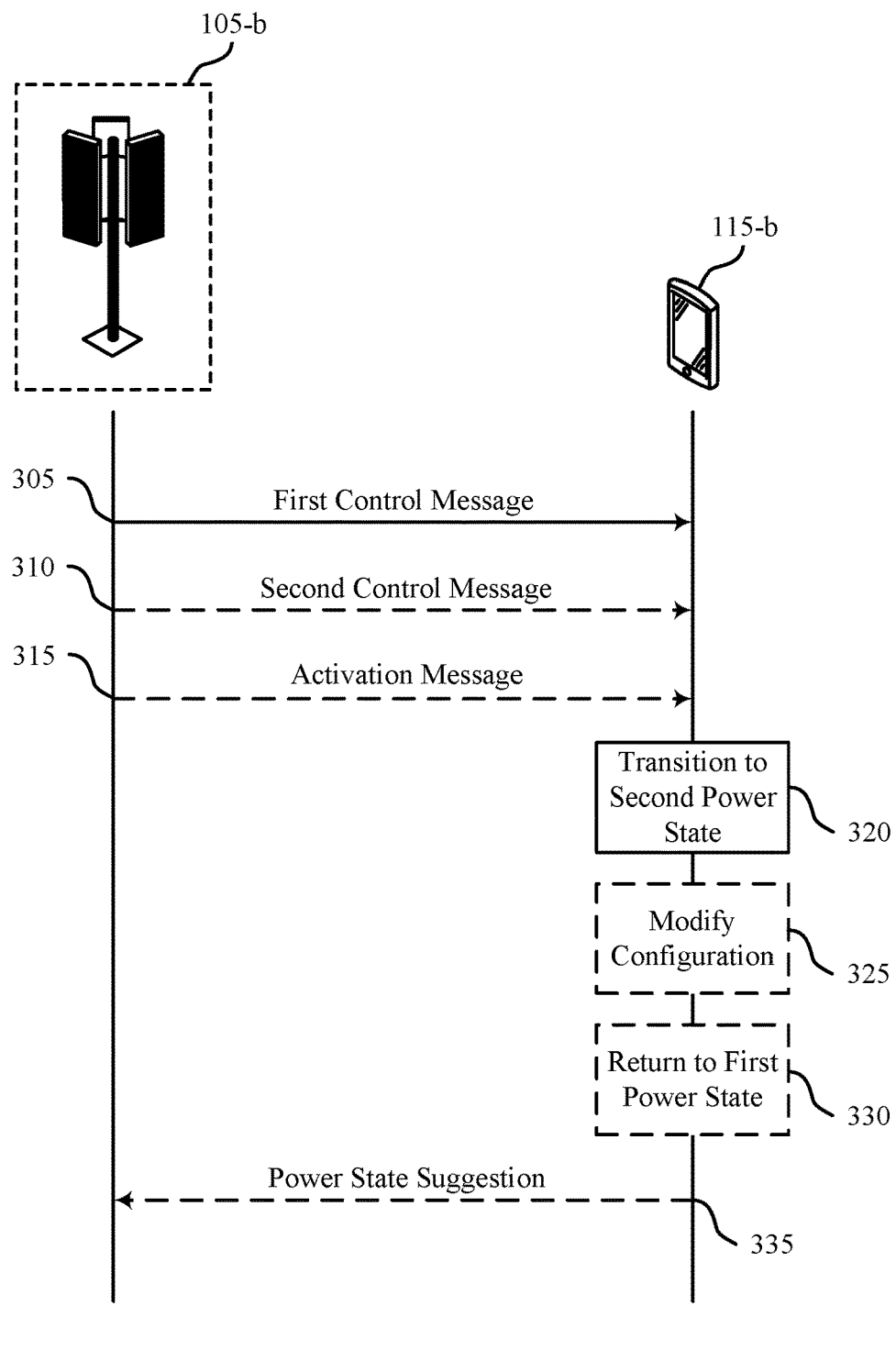
FIG. 3 illustrates an example of a process flow that supports considerations for communication power states in accordance with one or more aspects of the present disclosure.

FIG. 3 illustrates an example of a process flow 300 that supports considerations for communication power states in accordance with one or more aspects of the present disclosure. In some examples, the process flow 300 may implement or be implemented by aspects of the wireless communications system 100 or the wireless communications system 200. For example, the process flow 300 may include one or more network entities 105 (e.g., a network entity 105-*b*) and one or more UEs 115 (e.g., a UE 115-*b*), which may be examples of the corresponding devices as described with reference to FIG. 1. The process flow 300 may support transition of the UE 115-*b* between multiple power states, where each power state of the multiple power states is associated with a configuration of the UE 115-*b*.

At 305, the UE 115-*b* may receive a first control message indicating multiple power states, where each power state of the multiple power states is associated with a configuration of the UE. In some examples, the first control message may indicate a default power state from the multiple power states for each CC of multiple CCs.

In some cases, at 310, the UE 115-*b* may receive a second control message. In some examples, the second control message may indicate a periodicity associated with activation periods of each power state of the multiple power states.

Additionally, or alternatively, the second control message (e.g., or an additional control message) may indicate associations between the multiple power states and the multiple CCs. Additionally, or alternatively, the second control message (e.g., or an additional control message) may indicate multiple power state patterns, where each power state of the multiple power states is associated with one or more CCs of the multiple CCs based on a power state pattern from the multiple power state patterns. In some examples, each power state pattern of the multiple power state patterns may indicate respective durations associated with activation of each power state associated with the power state pattern.

Additionally, or alternatively, the second control message (e.g., or an additional control message) may indicate multiple TDD patterns, where each TDD pattern is associated with a power state (e.g., or power state pattern) of the UE 115-b. Additionally, or alternatively, the second control message (e.g., or an additional control message) may indicate multiple RRM configurations, where each RRM configurations is associated with a power state (e.g., or power state pattern) of the UE 115-b.

In some examples, at 315, the UE 115-b may receive a third control message (e.g., activation message). In some examples, the third control message may indicate a second power state of the multiple power states. In some examples, the third control message may indicate the second power state may be activated for at least a first CC of the multiple CCs associated with the UE 115-b. In such cases, the second power state may be a default power state for the first CC. Additionally, or alternatively, the third control message may be received via the first CC of the multiple CCs. Alternatively, the third control message may be received via a second CC of the multiple CCs. In such cases, the indication of the second power state may be signaled via a CIF in the third control message. Additionally, or alternatively, the third control message may include one or more bits indicating whether the second power state is activated for the multiple CCs or is activated for a subset of the multiple CCs, the subset comprising the at least first CC.

Additionally, or alternatively, the third control message (e.g., or an additional control message) may indicate a first TDD pattern from the multiple TDD patterns, where the first TDD pattern may be associated with the second power state. Additionally, or alternatively, the third control message (e.g., or an additional control message) may indicate a first RRM configuration from the multiple RRM configurations, where the first RRM configuration may be associated with the second power state.

At 320, the UE 115-b may transition from a first power state of the multiple power states to the second power state of the multiple power states based on a condition being satisfied. In such cases, a first configuration of the UE associated with the first power state may be different than a second configuration of the UE associated with the second power state. That is, In some examples, the UE 115-b may transition from the first power state to the second power state based on initiating a retransmission timer, where satisfying the condition is based on initiating the retransmission timer. In such cases, the UE 115-b may initiate the retransmission timer based on unsuccessfully receiving one or more downlink messages.

In some examples, the UE 115-b may transition from the first power state to the second power state based on transmitting a negative acknowledgment message for one or more downlink messages, where satisfying the condition is based on transmitting the negative acknowledgment message.

In some examples, the UE 115-b may transition from the first power state to the second power state based on a periodicity associated with activation periods of the second power state (e.g., as indicated in the second control message), where satisfying the condition is based on the UE 115-b operating in an activation period of the second power state.

In some examples, the UE 115-b may transition from the first power state to the second power state based on receiving a burst of downlink messages or one or more third control messages scheduling the burst of downlink messages, where satisfying the condition is based on receiving the end of the burst or receiving the one or more third control messages.

In some examples, the UE 115-b may transition from the first power state to the second power state based on receiving the third control message indicating the second power state, the first TDD pattern, the first RRM configuration, or any combination thereof, where satisfying the condition is based on receiving the third control message.

In some examples, the UE 115-b may transition from the first power state to the second power state (e.g., activate the second power state) for at least the first CC based on the second power state being associated with the first CC (e.g., as indicated in the second control message). Additionally, or alternatively, the second power state may be associated with a first power state pattern of the multiple power state patterns. In such cases, the UE 115-b may activate, deactivate, or make dormant, one or more CCs of the multiple CCs associated with the UE based on the first power state pattern.

In some examples, the second power state may be activated for the first CC of the multiple CCs and, in such cases, the UE 115-b may transition one or more second CCs of the multiple CCs to one or more third power states of the multiple power states based on activating the second power state for the first CC. Conversely, the UE 115-b may activate (e.g., transition to) the one or more third power states for the one or more second CC of the multiple CCs and activate the second power state for the first CC based on activating the one or more third power states for the one or more second CCs (e.g., satisfying the condition may be based on activating the one or more third power states for the one or more second CCs).

In some examples, the UE 115-b may transition to the second power state based on a buffer of the UE 115-b falling below a threshold (e.g., satisfying the condition may be based on the buffer of the UE 115-b falling below the threshold). In other words, the UE 115-b may determine one or more CCs of the multiple CCs may be inactive based on the buffer of the UE 115-b falling below the threshold. In such cases, the UE 115-b may transmit an indication to deactivate the one or more CCs based on the buffer of the UE 115-b falling below the threshold. Additionally, or alternatively, the UE 115-b may deactivate the one or more CC of the multiple CCs based on expiration of a timer (e.g., associated with the one or more CCs), where the one or more CCs are reactivated after expiration of the timer.

In some cases, at 325, the UE 115-b may switch from the first configuration of the UE 115-b to the second configuration of the UE 115-b based on transitioning the first power state to the second power state.

Figure 4:
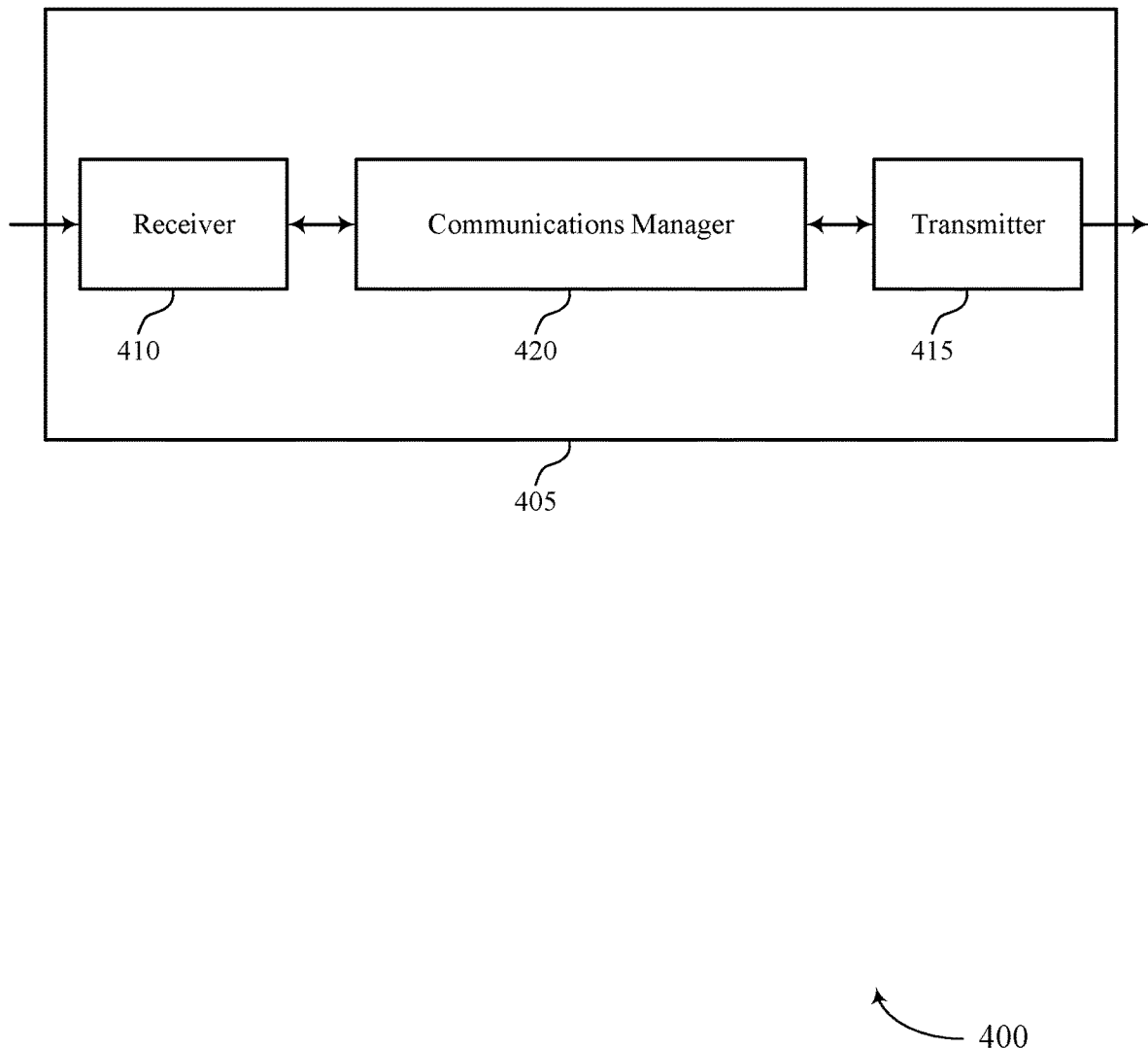
FIGS. 4 and 5 illustrate block diagrams of devices that support considerations for communication power states in accordance with one or more aspects of the present disclosure.

In some examples, at 330, the UE 115-b may transition from the second power state to (e.g., back to) the first power state based on expiration of a timer, where a duration of the timer is associated with the second power state. That is, each power state of the multiple power states may be associated with a respective duration. In some examples, the first power state may be a default power state, such that the UE 115-*b* transitions from an additional power state of the multiple power states to the first power state based on expiration of a timer, where a duration of the power In some cases, at 335, the UE 115-*b* may transmit an indication of one or more suggest power state patterns from the multiple power state patterns, one or more suggested power states from the multiple power states, or any combination thereof, from the FIG. 4 illustrates a block diagram 400 of a device 405 that supports considerations for communication power states in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to considerations for communication power states). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to considerations for communication power states). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of considerations for communication power states as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for receiving a first control message indicating a set of multiple power states, where each power state of the set of multiple power states is associated with a configuration of the UE. The communications manager 420 may be configured as or otherwise support a means for transitioning from a first power state of the set of multiple power states to a second power state of the set of multiple power states based on a condition being satisfied, where a first configuration of the UE associated with the first power state is different than a second configuration of the UE associated with the second power state.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for transitioning between multiple power states, which may result in reduced processing, reduced power consumption, and more efficient utilization of communication resources, among other advantages.

Figure 5:
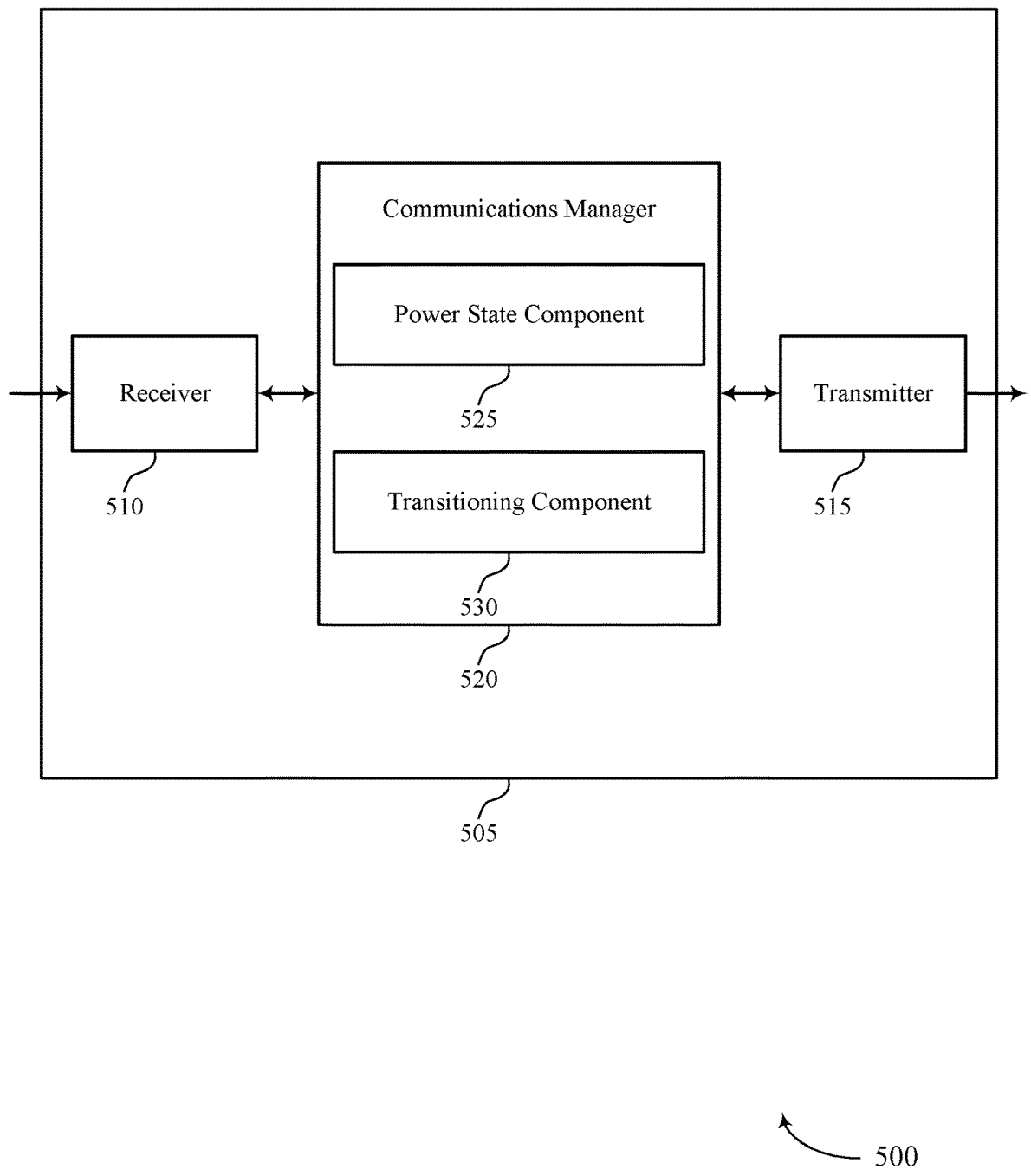

FIG. 5 illustrates a block diagram 500 of a device 505 that supports considerations for communication power states in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to considerations for communication power states). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to considerations for communication power states). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of considerations for communication power states as described herein. For example, the communications manager 520 may include a power state component 525 a transitioning component 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The power state component 525 may be configured as or otherwise support a means for receiving a first control message indicating a set of multiple power states, where each power state of the set of multiple power states is associated with a configuration of the UE. The transitioning component 530 may be configured as or otherwise support a means for transitioning from a first power state of the set of multiple power states to a second power state of the set of multiple power states based on a condition being satisfied, where a first configuration of the UE associated with the first power state is different than a second configuration of the UE associated with the second power state.

Figure 6:
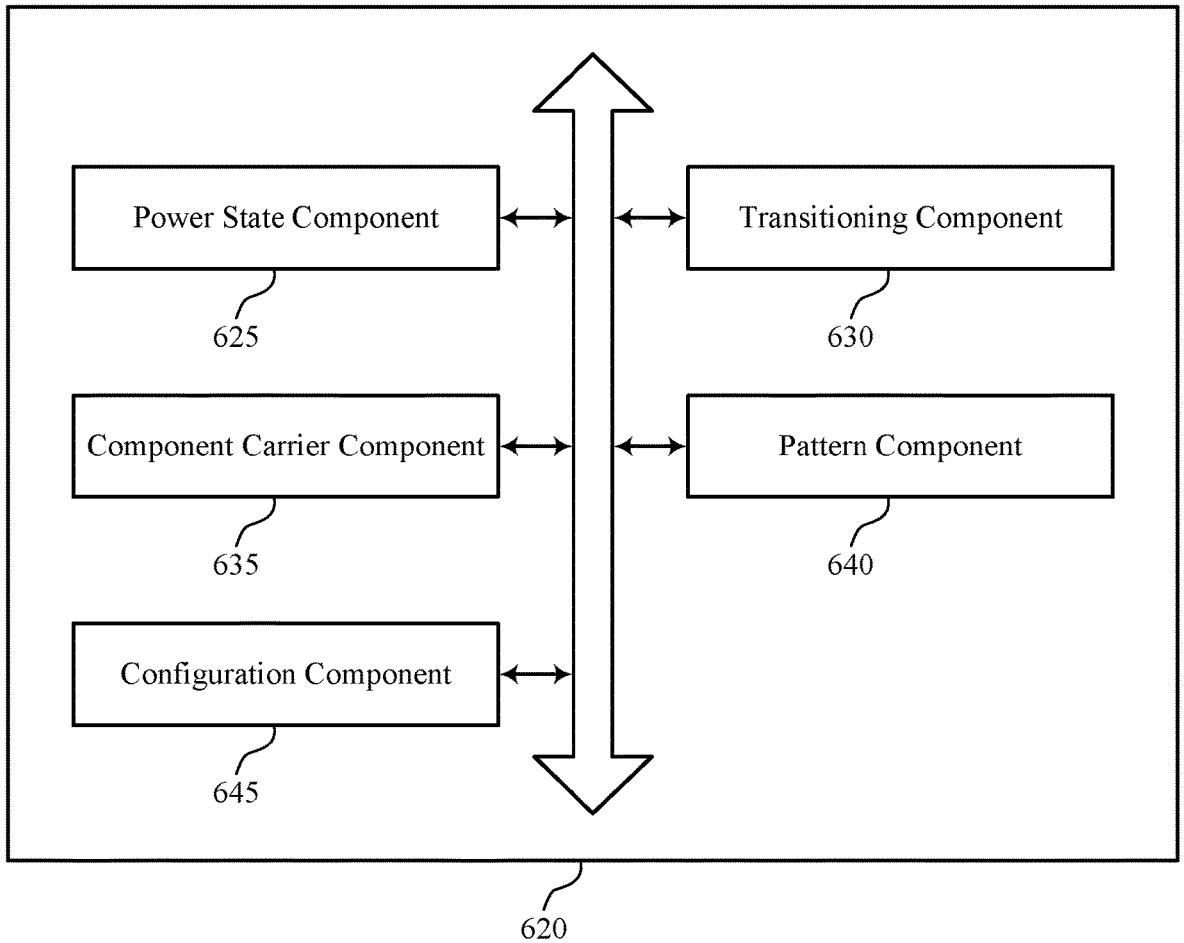
FIG. 6 illustrates a block diagram of a communications manager that supports considerations for communication power states in accordance with one or more aspects of the present disclosure.

FIG. 6 illustrates a block diagram 600 of a communications manager 620 that supports considerations for communication power states in accordance with one or more aspects of the present disclosure. The communications manager 620 may be an example of aspects of a communications manager 420, a communications manager 520, or both, as described herein. The communications manager 620, or various components thereof, may be an example of means for performing various aspects of considerations for communication power states as described herein. For example, the communications manager 620 may include a power state component 625, a transitioning component 630, a CC component 635, a pattern component 640, a configuration component 645, or any combination thereof. Each of these components may communicate, directly or indirectly, with one another (e.g., via one or more buses).

The communications manager 620 may support wireless communications at a UE in accordance with examples as disclosed herein. The power state component 625 may be configured as or otherwise support a means for receiving a first control message indicating a set of multiple power states, where each power state of the set of multiple power states is associated with a configuration of the UE. The transitioning component 630 may be configured as or otherwise support a means for transitioning from a first power state of the set of multiple power states to a second power state of the set of multiple power states based on a condition being satisfied, where a first configuration of the UE associated with the first power state is different than a second configuration of the UE associated with the second power state.

In some examples, to support transitioning from the first power state to the second power state, the transitioning component 630 may be configured as or otherwise support a means for transitioning from the first power state to the second power state based on initiating a retransmission timer, where satisfying the condition is based on initiating the retransmission timer.

In some examples, initiating the retransmission timer is based on unsuccessfully receiving one or more downlink messages.

In some examples, to support transitioning from the first power state to the second power state, the transitioning component 630 may be configured as or otherwise support a means for transitioning from the first power state to the second power state based on transmitting a negative acknowledgment message for one or more downlink messages, where satisfying the condition is based on transmitting the negative acknowledgment message.

In some examples, the transitioning component 630 may be configured as or otherwise support a means for receiving a second control message indicating a periodicity associated with activation periods of the second power state, where satisfying the condition is based on the UE operating in an activation period of the second power state.

In some examples, to support transitioning from the first power state to the second power state, the transitioning component 630 may be configured as or otherwise support a means for transitioning from the first power state to the second power state based on receiving a burst of downlink messages or one or more second control messages scheduling the burst of downlink messages, where satisfying the condition is based on receiving the end of the burst or receiving the one or more second control messages.

In some examples, the transitioning component 630 may be configured as or otherwise support a means for transitioning from the second power state to the first power state based on expiration of a timer, where a duration of the timer is associated with the second power state.

In some examples, the power state component 625 may be configured as or otherwise support a means for receiving a second control message indicating the second power state of the set of multiple power states, where satisfying the condition is based on receiving the second control message.

In some examples, the second control message indicates the second power state is activated for at least a first CC of a set of multiple CCs associated with the UE.

In some examples, the second control message is received via the first CC of the set of multiple CCs.

In some examples, the second control message is received via a second CC of the set of multiple CCs, and the indication of the second power state is signaled via a carrier index field in the second control message.

In some examples, the second control message includes one or more bits indicating whether the second power state is activated for the set of multiple CCs or is activated for a subset of the set of multiple CCs, the subset including the at least first CC.

In some examples, the second power state is activated for at least a first CC of a set of multiple CCs associated with the UE, and the CC component 635 may be configured as or otherwise support a means for receiving a second control message indicating associations between the set of multiple power states and the set of multiple CCs, where the second power state is activated for the at least first CC based on the second power state being associated with the at least first CC.

In some examples, the second power state is associated with a first power state pattern of a set of multiple power state patterns, and the CC component 635 may be configured as or otherwise support a means for activating, deactivating, or making dormant one or more CCs of a set of multiple CCs associated with the UE based on the first power state pattern, where each power state of the set of multiple power states is associated with one or more CCs of the set of multiple CCs based on a power state pattern from the set of multiple power state patterns.

In some examples, the pattern component 640 may be configured as or otherwise support a means for receiving a second control message indicating the set of multiple power state patterns including at least the first power state pattern.

In some examples, each power state pattern of the set of multiple power state patterns indicates respective durations associated with activation of each power state associated with the power state pattern.

In some examples, the pattern component 640 may be configured as or otherwise support a means for transmitting an indication of one or more suggested power state patterns from the set of multiple power state patterns, where the one or more suggested power state patterns includes the first power state pattern.

In some examples, the second power state is activated for a first CC of a set of multiple CCs associated with the UE, and the transitioning component 630 may be configured as or otherwise support a means for transitioning one or more second CCs of the set of multiple CCs to one or more third power states of the set of multiple power states based on activating the second power state for the first CC.

In some examples, satisfying the condition is based on activating the third power state for the second CC.

In some examples, the first control message indicates a default power state from the set of multiple power states for each CC of a set of multiple CCs. In some examples, the second power state is a default power state for a first CC of the set of multiple CCs.

In some examples, the pattern component 640 may be configured as or otherwise support a means for receiving a second control message indicating a first TDDing pattern from a set of multiple TDDing patterns, where satisfying the condition is based on receiving the first TDDing pattern.

In some examples, the pattern component 640 may be configured as or otherwise support a means for receiving a third control message indicating the set of multiple TDDing patterns, where each TDDing pattern is associated with a power state of the UE, and where the first TDDing pattern is associated with the second power state.

In some examples, the configuration component 645 may be configured as or otherwise support a means for receiving a second control message indicating a first RRM configuration from a set of multiple RRM configurations, where satisfying the condition is based on receiving the first RRM configuration.

In some examples, the configuration component 645 may be configured as or otherwise support a means for receiving a third control message indicating the set of multiple RRM configurations, where each RRM configuration is associated with a power state of the UE, and where the first RRM configuration is associated with the second power state.

In some examples, satisfying the condition is based on a buffer of the UE falling below a threshold.

In some examples, the CC component 635 may be configured as or otherwise support a means for determining one or more CCs of a set of multiple CCs associated with the UE are inactive based on the buffer of the UE falling below the threshold.

In some examples, the CC component 635 may be configured as or otherwise support a means for transmitting an indication to deactivate the one or more CCs based on the buffer of the UE falling below the threshold.

In some examples, the CC component 635 may be configured as or otherwise support a means for deactivating the one or more CCs of the set of multiple CCs based on a timer, where the one or more CCs are reactivated after expiration of the timer.

In some examples, the configuration component 645 may be configured as or otherwise support a means for switching the first configuration of the UE to the second configuration of the UE based on transitioning from the first power state to the second power state.

Figure 7:
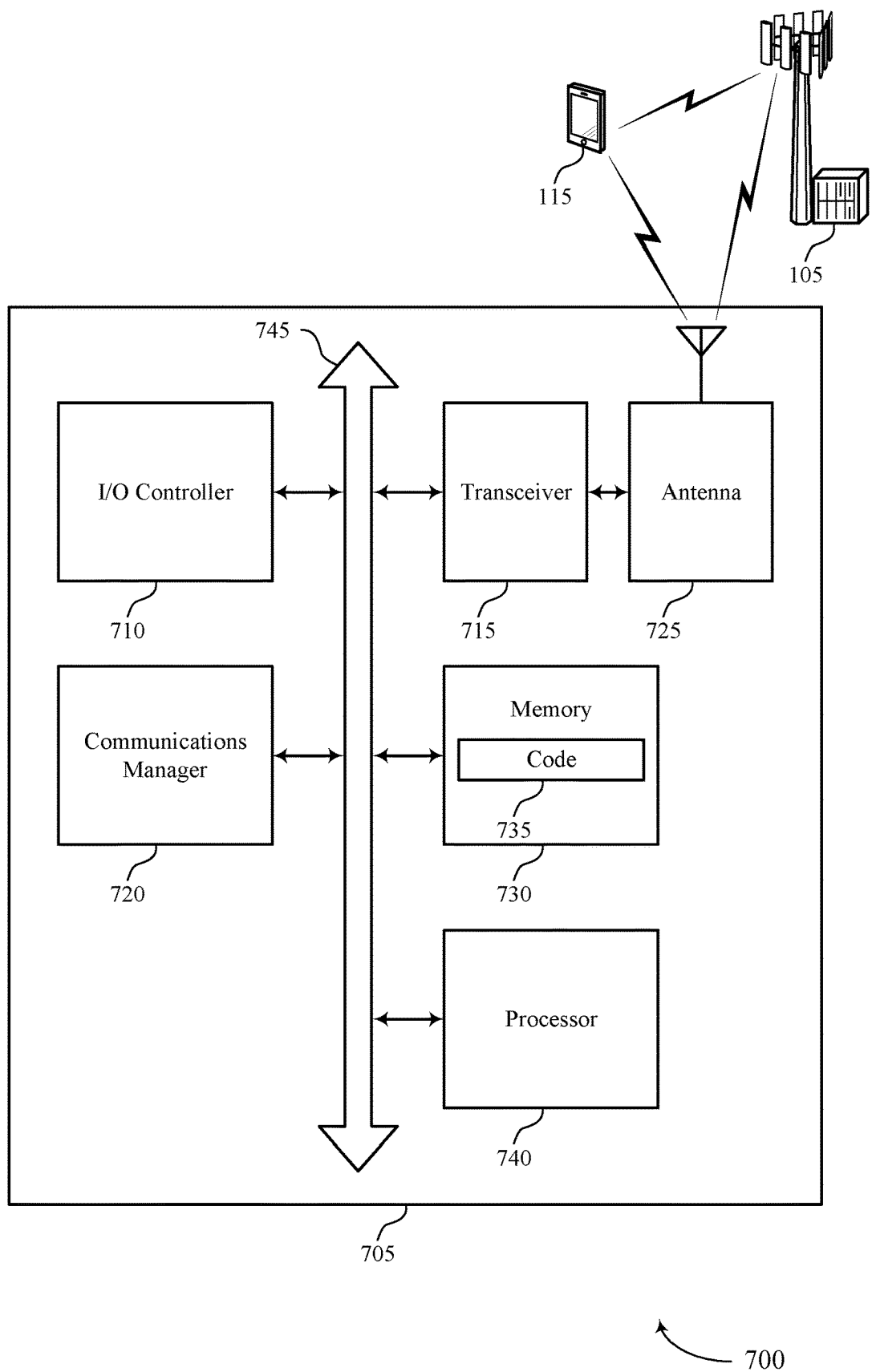
FIG. 7 illustrates a diagram of a system including a device that supports considerations for communication power states in accordance with one or more aspects of the present disclosure.

FIG. 7 illustrates a diagram of a system 700 including a device 705 that supports considerations for communication power states in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting considerations for communication power states). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving a first control message indicating a set of multiple power states, where each power state of the set of multiple power states is associated with a configuration of the UE. The communications manager 720 may be configured as or otherwise support a means for transitioning from a first power state of the set of multiple power states to a second power state of the set of multiple power states based on a condition being satisfied, where a first configuration of the UE associated with the first power state is different than a second configuration of the UE associated with the second power state.

By including or configuring the communications manager 720 in accordance with examples as described herein, the device 705 may support techniques for transitioning between multiple power states, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of considerations for communication power states as described herein, or the processor 740 and the memory 730 may be otherwise configured to perform or support such operations.

Figure 8:
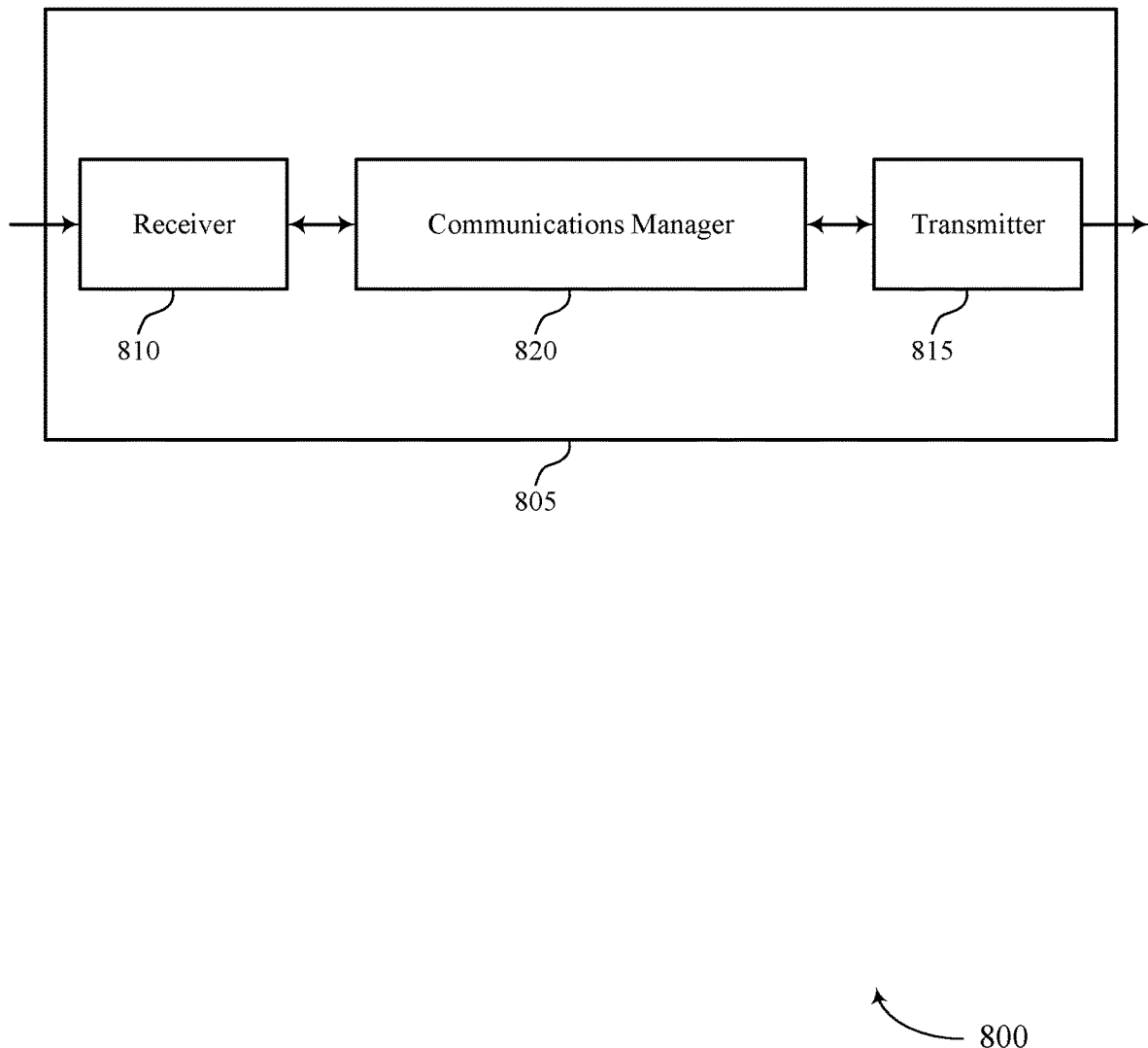
FIGS. 8 and 9 illustrate block diagrams of devices that support considerations for communication power states in accordance with one or more aspects of the present disclosure.

FIG. 8 illustrates a block diagram 800 of a device 805 that supports considerations for communication power states in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of considerations for communication power states as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for transmitting a first control message indicating a set of multiple power states, where each power state of the set of multiple power states is associated with a configuration of a UE. The communications manager 820 may be configured as or otherwise support a means for transmitting a second control message activating a first power state of the set of multiple power states. The communications manager 820 may be configured as or otherwise support a means for communicating with the UE based on the configuration associated with the first power state.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for transitioning between multiple power states, which may result in reduced processing, reduced power consumption, and more efficient utilization of communication resources, among other advantages.

Figure 9:
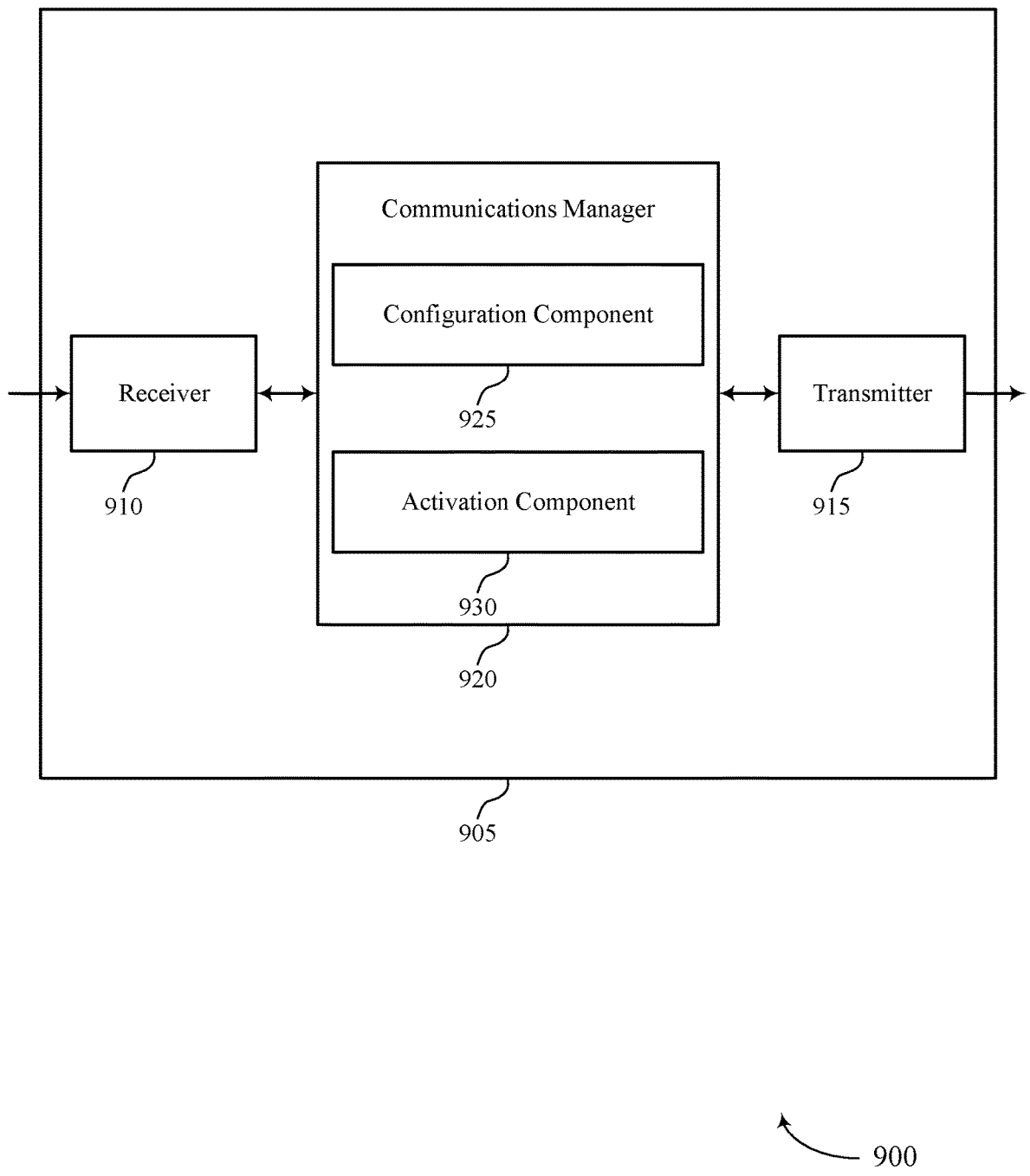

FIG. 9 illustrates a block diagram 900 of a device 905 that supports considerations for communication power states in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of considerations for communication power states as described herein. For example, the communications manager 920 may include a configuration component 925 an activation component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The configuration component 925 may be configured as or otherwise support a means for transmitting a first control message indicating a set of multiple power states, where each power state of the set of multiple power states is associated with a configuration of a UE. The activation component 930 may be configured as or otherwise support a means for transmitting a second control message activating a first power state of the set of multiple power states. The configuration component 925 may be configured as or otherwise support a means for communicating with the UE based on the configuration associated with the first power state.

Figure 10:
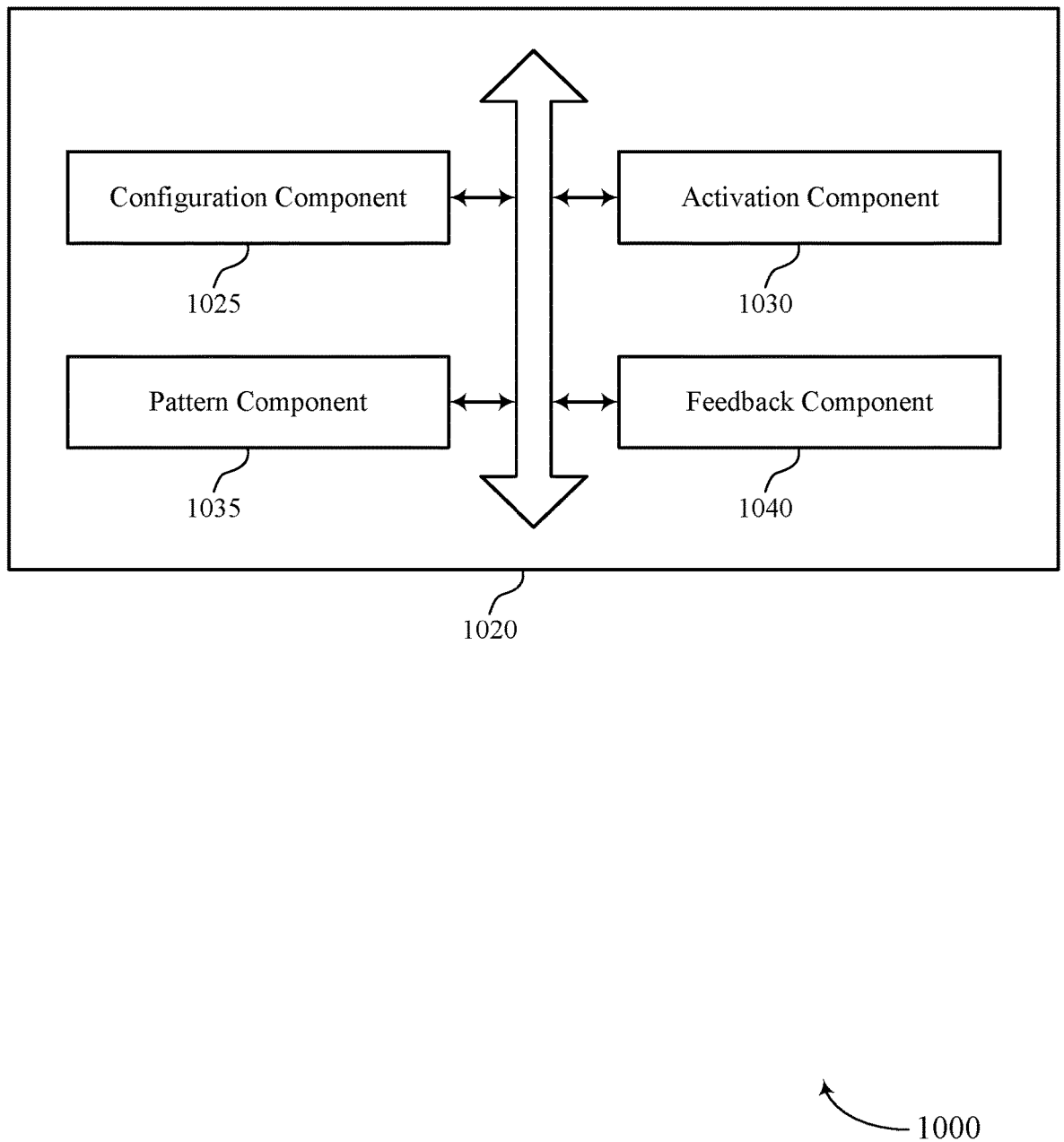
FIG. 10 illustrates a block diagram of a communications manager that supports considerations for communication power states in accordance with one or more aspects of the present disclosure.

FIG. 10 illustrates a block diagram 1000 of a communications manager 1020 that supports considerations for communication power states in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of considerations for communication power states as described herein. For example, the communications manager 1020 may include a configuration component 1025, an activation component 1030, a pattern component 1035, a feedback component 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The configuration component 1025 may be configured as or otherwise support a means for transmitting a first control message indicating a set of multiple power states, where each power state of the set of multiple power states is associated with a configuration of a UE. The activation component 1030 may be configured as or otherwise support a means for transmitting a second control message activating a first power state of the set of multiple power states. In some examples, the configuration component 1025 may be configured as or otherwise support a means for communicating with the UE based on the configuration associated with the first power state.

In some examples, the second control message indicates the first power state is activated for at least a first CC of a set of multiple CCs.

In some examples, the second control message is transmitted via the first CC of the set of multiple CCs.

In some examples, the second control message is transmitted via a second CC of the set of multiple CCs, and the indication of the first power state is signaled via a carrier index field.

In some examples, the second control message includes one or more bits indicating whether the first power state is activated for the set of multiple CCs or is activated for a subset of the set of multiple CCs, the subset including the at least first CC.

In some examples, the first power state is activated for at least a first CC of a set of multiple CCs, and the configuration component 1025 may be configured as or otherwise support a means for transmitting a third control message indicating associations between the set of multiple power states and the set of multiple CCs where the first power state is activated for the at least first CC based on the first power state being associated with the at least first CC.

In some examples, the second control message indicates a first power state pattern from a set of multiple power state patterns, and the pattern component 1035 may be configured as or otherwise support a means for transmitting a third control message indicating a set of multiple power state patterns, where each power state of the set of multiple power states is associated with one or more CCs of the set of multiple CCs based on a power state pattern from the set of multiple power state patterns, and where the first power state is associated with the first power state pattern.

In some examples, each power state pattern of the set of multiple power state patterns indicates respective durations associated with activation of each power state associated with the power state pattern.

In some examples, the feedback component 1040 may be configured as or otherwise support a means for receiving an indication of one or more suggested power state patterns from the set of multiple power state patterns, where the one or more suggested power state patterns includes the first power state pattern.

In some examples, the first control message indicates a default power state from the set of multiple power states for each CC of a set of multiple CCs. In some examples, the first power state is a default power state for a first CC of the set of multiple CCs.

In some examples, the second control message indicates a first TDDing pattern from a set of multiple TDDing patterns. In some examples, activation of the first power state is based on the first TDDing pattern.

In some examples, the pattern component 1035 may be configured as or otherwise support a means for transmitting a third control message indicating the set of multiple TDDing patterns, where each TDDing pattern is associated with a power state of the UE, and where the first TDDing pattern is associated with the first power state.

In some examples, the second control message indicates a first RRM configuration from a set of multiple RRM configurations. In some examples, activation of the first power state is based on the first RRM configuration.

In some examples, the configuration component 1025 may be configured as or otherwise support a means for transmitting a third control message indicating the set of multiple RRM configurations, where each RRM configuration is associated with a power state of the UE, and where the first RRM configuration is associated with the first power state.

In some examples, the feedback component 1040 may be configured as or otherwise support a means for receiving an indication to deactivate one or more CCs based on a buffer of the UE falling below a threshold.

Figure 11:
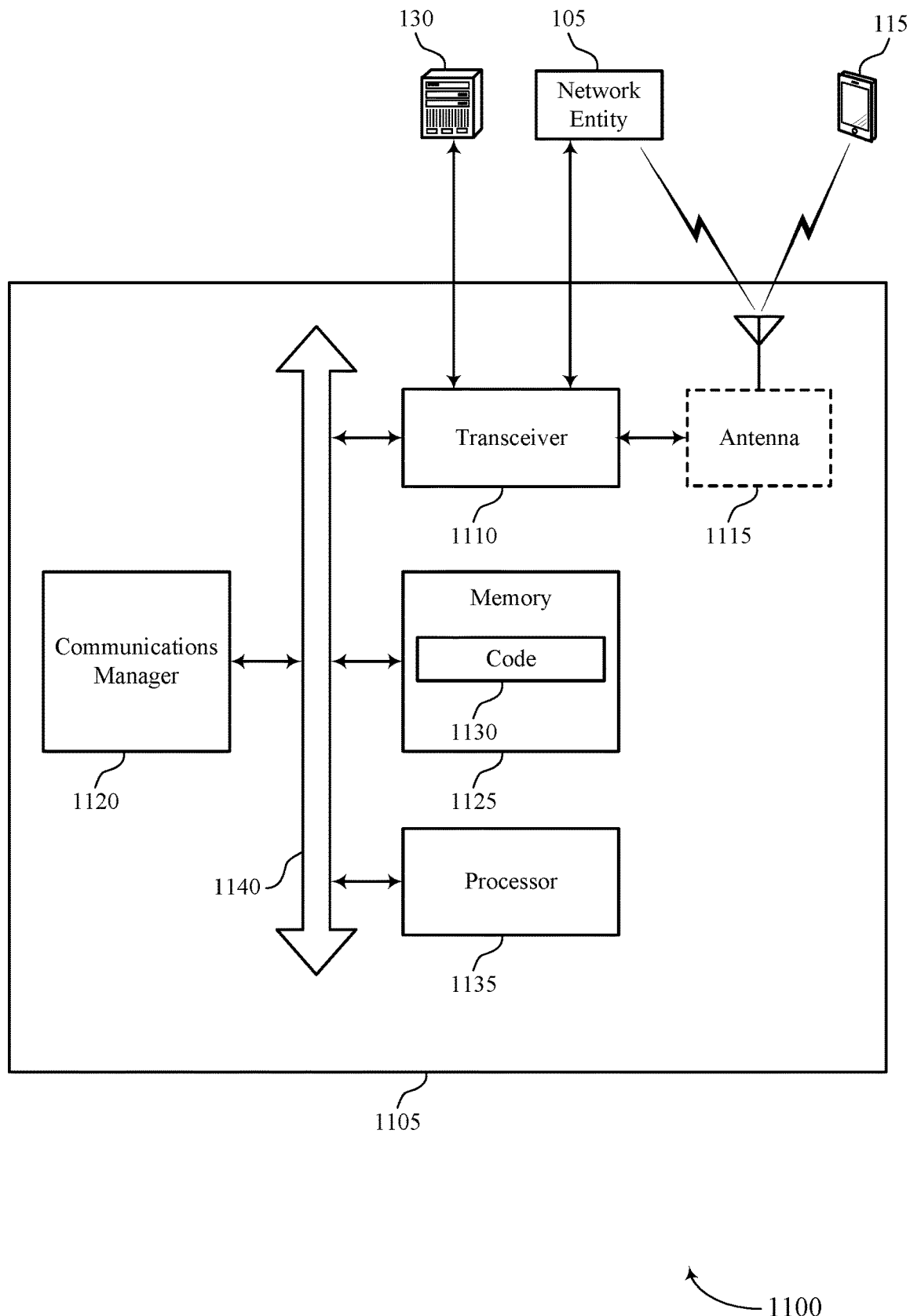
FIG. 11 illustrates a diagram of a system including a device that supports considerations for communication power states in accordance with one or more aspects of the present disclosure.

FIG. 11 illustrates a diagram of a system 1100 including a device 1105 that supports considerations for communication power states in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting considerations for communication power states). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for transmitting a first control message indicating a set of multiple power states, where each power state of the set of multiple power states is associated with a configuration of a UE. The communications manager 1120 may be configured as or otherwise support a means for transmitting a second control message activating a first power state of the set of multiple power states. The communications manager 1120 may be configured as or otherwise support a means for communicating with the UE based on the configuration associated with the first power state.

By including or configuring the communications manager 1120 in accordance with examples as described herein, the device 1105 may support techniques for transitioning between multiple power states, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of considerations for communication power states as described herein, or the processor 1135 and the memory 1125 may be otherwise configured to perform or support such operations.

Figure 12:
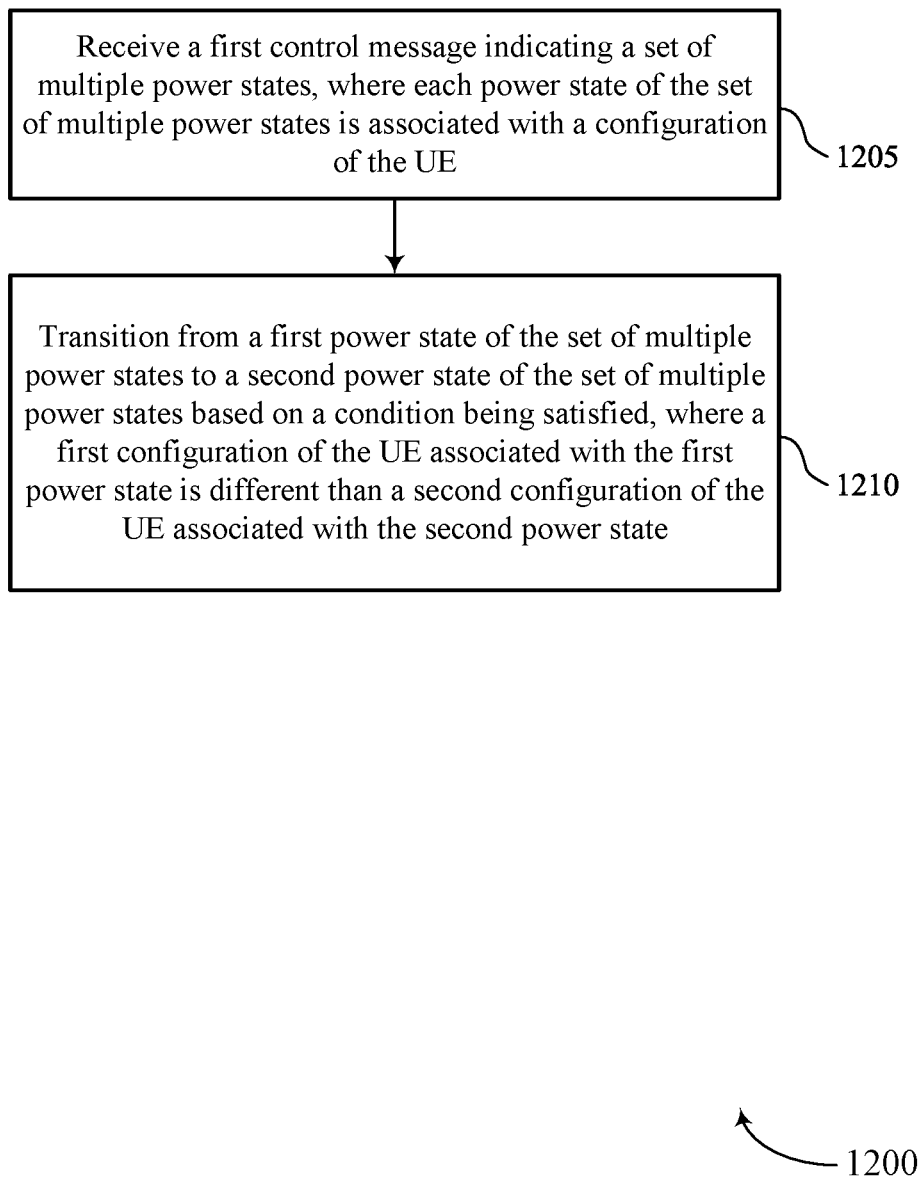
FIGS. 12 and 13 illustrate flowcharts showing methods that support considerations for communication power states in accordance with one or more aspects of the present disclosure.

FIG. 12 illustrates a flowchart showing a method 1200 that supports considerations for communication power states in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a first control message indicating a set of multiple power states, where each power state of the set of multiple power states is associated with a configuration of the UE. The operations of 1205 may be performed in accordance with examples as disclosed herein. In some examples, aspects of the operations of 1205 may be performed by a power state component 625 as described with reference to FIG. 6.

At 1210, the method may include transitioning from a first power state of the set of multiple power states to a second power state of the set of multiple power states based on a condition being satisfied, where a first configuration of the UE associated with the first power state is different than a second configuration of the UE associated with the second power state. The operations of 1210 may be performed in accordance with examples as disclosed herein. In some examples, aspects of the operations of 1210 may be performed by a transitioning component 630 as described with reference to FIG. 6.

Figure 13:
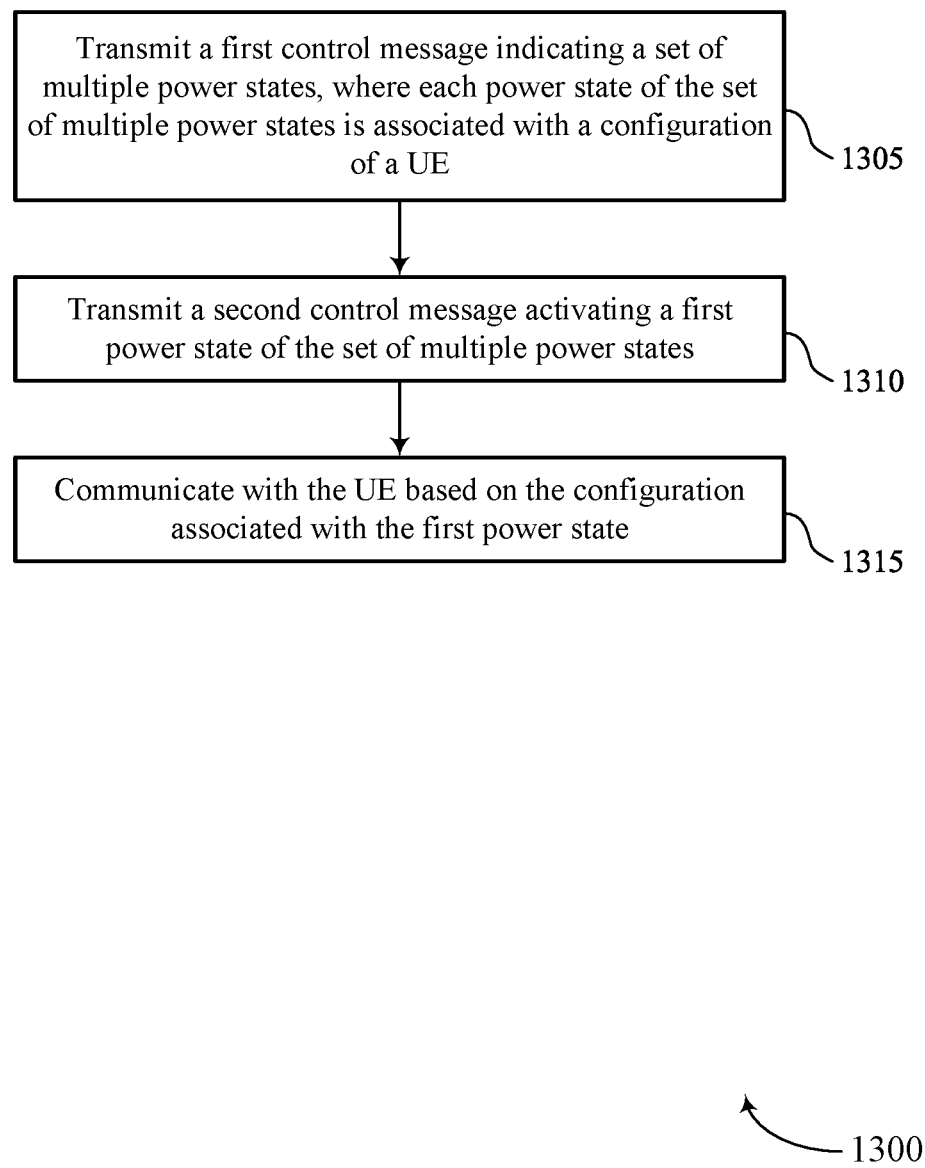

FIG. 13 illustrates a flowchart showing a method 1300 that supports considerations for communication power states in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include transmitting a first control message indicating a set of multiple power states, where each power state of the set of multiple power states is associated with a configuration of a UE. The operations of 1305 may be performed in accordance with examples as disclosed herein. In some examples, aspects of the operations of 1305 may be performed by a configuration component 1025 as described with reference to FIG. 10.

At 1310, the method may include transmitting a second control message activating a first power state of the set of multiple power states. The operations of 1310 may be performed in accordance with examples as disclosed herein. In some examples, aspects of the operations of 1310 may be performed by an activation component 1030 as described with reference to FIG. 10.

At 1315, the method may include communicating with the UE based on the configuration associated with the first power state. The operations of 1315 may be performed in accordance with examples as disclosed herein. In some examples, aspects of the operations of 1315 may be performed by a configuration component 1025 as described with reference to FIG. 10.

The following provides an overview of aspects of the present disclosure:

Aspect 1: A method for wireless communications at a UE, comprising: receiving a first control message indicating a plurality of power states, wherein each power state of the plurality of power states is associated with a configuration of the UE; and transitioning from a first power state of the plurality of power states to a second power state of the plurality of power states based at least in part on a condition being satisfied, wherein a first configuration of the UE associated with the first power state is different than a second configuration of the UE associated with the second power state.

Aspect 2: The method of aspect 1, wherein transitioning from the first power state to the second power state comprises: transitioning from the first power state to the second power state based at least in part on initiating a retransmission timer, wherein satisfying the condition is based at least in part on initiating the retransmission timer.

Aspect 3: The method of aspect 2, wherein initiating the retransmission timer is based at least in part on unsuccessfully receiving one or more downlink messages.

Aspect 4: The method of any of aspects 1 through 3, wherein transitioning from the first power state to the second power state comprises: transitioning from the first power state to the second power state based at least in part on transmitting a negative acknowledgment message for one or more downlink messages, wherein satisfying the condition is based at least in part on transmitting the negative acknowledgment message.

Aspect 5: The method of any of aspects 1 through 4, further comprising: receiving a second control message indicating a periodicity associated with activation periods of the second power state, wherein satisfying the condition is based at least in part on the UE operating in an activation period of the second power state.

Aspect 6: The method of any of aspects 1 through 5, wherein transitioning from the first power state to the second power state comprises: transitioning from the first power state to the second power state based at least in part on receiving a burst of downlink messages or one or more second control messages scheduling the burst of downlink messages, wherein satisfying the condition is based at least in part on receiving the end of the burst or receiving the one or more second control messages.

Aspect 7: The method of any of aspects 1 through 6, further comprising: transitioning from the second power state to the first power state based at least in part on expiration of a timer, wherein a duration of the timer is associated with the first power state.

Aspect 8: The method of any of aspects 1 through 7, further comprising: receiving a second control message indicating the second power state of the plurality of power states, wherein satisfying the condition is based at least in part on receiving the second control message.

Aspect 9: The method of aspect 8, wherein the second control message indicates the second power state is activated for at least a first CC of a plurality of CCs associated with the UE.

Aspect 10: The method of aspect 9, wherein the second control message is received via the first CC of the plurality of CCs.

Aspect 11: The method of aspect 9, wherein the second control message is received via a second CC of the plurality of CCs, and the indication of the second power state is signaled via a carrier index field in the second control message.

Aspect 12: The method of any of aspects 9 through 11, wherein the second control message comprises one or more bits indicating whether the second power state is activated for the plurality of CCs or is activated for a subset of the plurality of CCs, the subset comprising the at least first CC.

Aspect 13: The method of any of aspects 1 through 12, wherein the second power state is activated for at least a first CC of a plurality of CCs associated with the UE, the method further comprising: receiving a second control message indicating associations between the plurality of power states and the plurality of CCs, wherein the second power state is activated for the at least first CC based at least in part on the second power state being associated with the at least first CC.

Aspect 14: The method of any of aspects 1 through 13, wherein the second power state is associated with a first power state pattern of a plurality of power state patterns, the method further comprising: activating, deactivating, or making dormant one or more CCs of a plurality of CCs associated with the UE based at least in part on the first power state pattern, wherein each power state of the plurality of power states is associated with one or more CCs of the plurality of CCs based at least in part on a power state pattern from the plurality of power state patterns.

Aspect 15: The method of aspect 14, further comprising: receiving a second control message indicating the plurality of power state patterns comprising at least the first power state pattern.

Aspect 16: The method of aspect 15, wherein each power state pattern of the plurality of power state patterns indicates respective durations associated with activation of each power state associated with the power state pattern.

Aspect 17: The method of any of aspects 15 through 16, further comprising: transmitting an indication of one or more suggested power state patterns from the plurality of power state patterns, wherein the one or more suggested power state patterns comprises the first power state pattern.

Aspect 18: The method of any of aspects 1 through 17, wherein the second power state is activated for a first CC of a plurality of CCs associated with the UE, the method further comprising: transitioning one or more second CCs of the plurality of CCs to one or more third power states of the plurality of power states based at least in part on activating the second power state for the first CC.

Aspect 19: The method of any of aspects 1 through 18, activating the second power state for a first CC of a plurality of CCs associated with the UE based at least in part on activating a third power state for a second CC of the plurality of CCs, wherein satisfying the condition is based at least in part on activating the third power state for the second CC.

Aspect 20: The method of any of aspects 1 through 19, wherein the first control message indicates a default power state from the plurality of power states for each CC of a plurality of CCs, and the second power state is a default power state for a first CC of the plurality of CCs.

Aspect 21: The method of any of aspects 1 through 20, further comprising: receiving a second control message indicating a first TDDing pattern from a plurality of TDDing patterns, wherein satisfying the condition is based at least in part on receiving the first TDDing pattern.

Aspect 22: The method of aspect 21, further comprising: receiving a third control message indicating the plurality of TDDing patterns, wherein each TDDing pattern is associated with a power state of the UE, and wherein the first TDDing pattern is associated with the second power state.

Aspect 23: The method of any of aspects 1 through 22, further comprising: receiving a second control message indicating a first RRM configuration from a plurality of RRM configurations, wherein satisfying the condition is based at least in part on receiving the first RRM configuration.

Aspect 24: The method of aspect 23, further comprising: receiving a third control message indicating the plurality of RRM configurations, wherein each RRM configuration is associated with a power state of the UE, and wherein the first RRM configuration is associated with the second power state.

Aspect 25: The method of any of aspects 1 through 24, wherein satisfying the condition is based at least in part on a buffer of the UE falling below a threshold.

Aspect 26: The method of aspect 25, further comprising: determining one or more CCs of a plurality of CCs associated with the UE are inactive based at least in part on the buffer of the UE falling below the threshold.

Aspect 27: The method of aspect 26, further comprising: transmitting an indication to deactivate the one or more CCs based at least in part on the buffer of the UE falling below the threshold.

Aspect 28: The method of any of aspects 26 through 27, further comprising: deactivating the one or more CCs of the plurality of CCs based at least in part on a timer, wherein the one or more CCs are reactivated after expiration of the timer.

Aspect 29: The method of any of aspects 1 through 28, further comprising: switching the first configuration of the UE to the second configuration of the UE based at least in part on transitioning from the first power state to the second power state.

Aspect 30: A method for wireless communications at a network entity, comprising: transmitting a first control message indicating a plurality of power states, wherein each power state of the plurality of power states is associated with a configuration of a UE; transmitting a second control message activating a first power state of the plurality of power states; and communicating with the UE based at least in part on the configuration associated with the first power state.

Aspect 31: The method of aspect 30, wherein the second control message indicates the first power state is activated for at least a first CC of a plurality of CCs.

Aspect 32: The method of aspect 31, wherein the second control message is transmitted via the first CC of the plurality of CCs.

Aspect 33: The method of aspect 31, wherein the second control message is transmitted via a second CC of the plurality of CCs, and the indication of the first power state is signaled via a carrier index field.

Aspect 34: The method of any of aspects 31 through 33, wherein the second control message comprises one or more bits indicating whether the first power state is activated for the plurality of CCs or is activated for a subset of the plurality of CCs, the subset comprising the at least first CC.

Aspect 35: The method of any of aspects 30 through 34, wherein the first power state is activated for at least a first CC of a plurality of CCs, the method further comprising: transmitting a third control message indicating associations between the plurality of power states and the plurality of CCs wherein the first power state is activated for the at least first CC based at least in part on the first power state being associated with the at least first CC.

Aspect 36: The method of any of aspects 30 through 35, wherein the second control message indicates a first power state pattern from a plurality of power state patterns, the method further comprising: transmitting a third control message indicating a plurality of power state patterns, wherein each power state of the plurality of power states is associated with one or more CCs of the plurality of CCs based at least in part on a power state pattern from the plurality of power state patterns, and wherein the first power state is associated with the first power state pattern.

Aspect 37: The method of aspect 36, wherein each power state pattern of the plurality of power state patterns indicates respective durations associated with activation of each power state associated with the power state pattern.

Aspect 38: The method of any of aspects 36 through 37, further comprising: receiving an indication of one or more suggested power state patterns from the plurality of power state patterns, wherein the one or more suggested power state patterns comprises the first power state pattern.

Aspect 39: The method of any of aspects 30 through 38, wherein the first control message indicates a default power state from the plurality of power states for each CC of a plurality of CCs, and the first power state is a default power state for a first CC of the plurality of CCs.

Aspect 40: The method of any of aspects 30 through 39, wherein the second control message indicates a first TDDing pattern from a plurality of TDDing patterns, and activation of the first power state is based at least in part on the first TDDing pattern.

Aspect 41: The method of aspect 40, further comprising: transmitting a third control message indicating the plurality of TDDing patterns, wherein each TDDing pattern is associated with a power state of the UE, and wherein the first TDDing pattern is associated with the first power state.

Aspect 42: The method of any of aspects 30 through 41, wherein the second control message indicates a first RRM configuration from a plurality of RRM configurations, and activation of the first power state is based at least in part on the first RRM configuration.

Aspect 43: The method of aspect 42, further comprising: transmitting a third control message indicating the plurality of RRM configurations, wherein each RRM configuration is associated with a power state of the UE, and wherein the first RRM configuration is associated with the first power state.

Aspect 44: The method of any of aspects 30 through 43, further comprising: receiving an indication to deactivate one or more CCs based at least in part on a buffer of the UE falling below a threshold.

Aspect 45: An apparatus for wireless communications at a UE, comprising a processor; memory coupled with the processor; and instructions stored in the memory and executable by the processor to cause the apparatus to perform a method of any of aspects 1 through 29.

Aspect 46: An apparatus for wireless communications at a UE, comprising at least one means for performing a method of any of aspects 1 through 29.

Aspect 47: A non-transitory computer-readable medium storing code for wireless communications at a UE, the code comprising instructions executable by a processor to perform a method of any of aspects 1 through 29.

Aspect 48: An apparatus for wireless communications at a network entity, comprising a processor; memory coupled with the processor; and instructions stored in the memory and executable by the processor to cause the apparatus to perform a method of any of aspects 30 through 44.

Aspect 49: An apparatus for wireless communications at a network entity, comprising at least one means for performing a method of any of aspects 30 through 44.

Aspect 50: A non-transitory computer-readable medium storing code for wireless communications at a network entity, the code comprising instructions executable by a processor to perform a method of any of aspects 30 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
   receive a first control message indicating a plurality of power states, wherein each power state of the plurality of power states is associated with a configuration of the UE;
   transition from a first power state of the plurality of power states to a second power state of the plurality of power states based at least in part on a condition being satisfied, wherein a first configuration of the UE associated with the first power state is different than a second configuration of the UE associated with the second power state, wherein the second power state is associated with a first power state pattern of a plurality of power state patterns; and
   activate, deactivate, or make dormant one or more component carriers of a plurality of component carriers associated with the UE based at least in part on the first power state pattern, wherein each power state of the plurality of power states is associated with one or more component carriers of the plurality of component carriers based at least in part on a power state pattern from the plurality of power state patterns.

2. The apparatus of claim 1, wherein the instructions to transition from the first power state to the second power state are executable by the one or more processors to cause the apparatus to:
transition from the first power state to the second power state based at least in part on initiating a retransmission timer, wherein satisfying the condition is based at least in part on initiating the retransmission timer.

3. The apparatus of claim 1, wherein the instructions to transition from the first power state to the second power state are executable by the one or more processors to cause the apparatus to:
transition from the first power state to the second power state based at least in part on transmitting a negative acknowledgment message for one or more downlink messages, wherein satisfying the condition is based at least in part on transmitting the negative acknowledgment message.

4. The apparatus of claim 1, wherein the instructions are further executable by the one or more processors to cause the apparatus to:
receive a second control message indicating a periodicity associated with activation periods of the second power state, wherein satisfying the condition is based at least in part on the UE operating in an activation period of the second power state.

5. The apparatus of claim 1, wherein the instructions to transition from the first power state to the second power state are executable by the one or more processors to cause the apparatus to:
transition from the first power state to the second power state based at least in part on receiving a burst of downlink messages or one or more second control messages scheduling the burst of downlink messages, wherein satisfying the condition is based at least in part on receiving the end of the burst or receiving the one or more second control messages.

6. The apparatus of claim 1, wherein the instructions are further executable by the one or more processors to cause the apparatus to:
transition from the second power state to the first power state based at least in part on expiration of a timer, wherein a duration of the timer is associated with the second power state.

7. The apparatus of claim 1, wherein the instructions are further executable by the one or more processors to cause the apparatus to:
receive a second control message indicating the second power state of the plurality of power states, wherein satisfying the condition is based at least in part on receiving the second control message.

8. The apparatus of claim 7, wherein the second control message indicates the second power state is activated for at least a first component carrier of a plurality of component carriers associated with the UE.

9. The apparatus of claim 1, wherein the second power state is activated for at least a first component carrier of a plurality of component carriers associated with the UE, and the instructions are further executable by the one or more processors to cause the apparatus to:
receive a second control message indicating associations between the plurality of power states and the plurality of component carriers, wherein the second power state is activated for the at least first component carrier based at least in part on the second power state being associated with the at least first component carrier.

10. The apparatus of claim 1, wherein the instructions are further executable by the one or more processors to cause the apparatus to:
receive a second control message indicating the plurality of power state patterns comprising at least the first power state pattern.

11. The apparatus of claim 10, wherein the instructions are further executable by the one or more processors to cause the apparatus to:
transmit an indication of one or more suggested power state patterns from the plurality of power state patterns, wherein the one or more suggested power state patterns comprises the first power state pattern.

12. The apparatus of claim 1, wherein the second power state is activated for a first component carrier of a plurality of component carriers associated with the UE, and the instructions are further executable by the one or more processors to cause the apparatus to:
transition one or more second component carriers of the plurality of component carriers to one or more third power states of the plurality of power states based at least in part on activating the second power state for the first component carrier.

13. The apparatus of claim 12, wherein satisfying the condition is based at least in part on activating the third power state for the second component carrier.

14. The apparatus of claim 1, wherein the instructions are further executable by the one or more processors to cause the apparatus to:
receive a second control message indicating a first time division duplexing pattern from a plurality of time division duplexing patterns, wherein satisfying the condition is based at least in part on receiving the first time division duplexing pattern.

15. The apparatus of claim 14, wherein the instructions are further executable by the one or more processors to cause the apparatus to:
receive a third control message indicating the plurality of time division duplexing patterns, wherein each time division duplexing pattern is associated with a power state of the UE, and wherein the first time division duplexing pattern is associated with the second power state.

16. The apparatus of claim 1, wherein the instructions are further executable by the one or more processors to cause the apparatus to:
receive a second control message indicating a first radio resource management configuration from a plurality of radio resource management configurations, wherein satisfying the condition is based at least in part on receiving the first radio resource management configuration.

17. The apparatus of claim 16, wherein the instructions are further executable by the one or more processors to cause the apparatus to:
receive a third control message indicating the plurality of radio resource management configurations, wherein each radio resource management configuration is associated with a power state of the UE, and wherein the first radio resource management configuration is associated with the second power state.

18. The apparatus of claim 1, wherein satisfying the condition is based at least in part on a buffer of the UE falling below a threshold.

19. The apparatus of claim 18, wherein the instructions are further executable by the one or more processors to cause the apparatus to:
  determine one or more component carriers of a plurality of component carriers associated with the UE are inactive based at least in part on the buffer of the UE falling below the threshold.

20. The apparatus of claim 1, wherein the instructions are further executable by the one or more processors to cause the apparatus to:
  switch the first configuration of the UE to the second configuration of the UE based at least in part on transitioning from the first power state to the second power state.

21. A method for wireless communications at a user equipment (UE), comprising:
  receiving a first control message indicating a plurality of power states, wherein each power state of the plurality of power states is associated with a configuration of the UE; and
  transitioning from a first power state of the plurality of power states to a second power state of the plurality of power states based at least in part on a condition being satisfied, wherein a first configuration of the UE associated with the first power state is different than a second configuration of the UE associated with the second power state, wherein the second power state is associated with a first power state pattern of a plurality of power state patterns; and
  activating, deactivating, or making dormant one or more component carriers of a plurality of component carriers associated with the UE based at least in part on the first power state pattern, wherein each power state of the plurality of power states is associated with one or more component carriers of the plurality of component carriers based at least in part on a power state pattern from the plurality of power state patterns.

22. The method of claim 21, wherein transitioning from the first power state to the second power state comprises:
  transitioning from the first power state to the second power state based at least in part on initiating a retransmission timer, wherein satisfying the condition is based at least in part on initiating the retransmission timer.

23. The method of claim 21, wherein transitioning from the first power state to the second power state comprises:
  transitioning from the first power state to the second power state based at least in part on transmitting a negative acknowledgment message for one or more downlink messages, wherein satisfying the condition is based at least in part on transmitting the negative acknowledgment message.

24. The method of claim 21, further comprising:
  receiving a second control message indicating a periodicity associated with activation periods of the second power state, wherein satisfying the condition is based at least in part on the UE operating in an activation period of the second power state.

25. The method of claim 21, wherein transitioning from the first power state to the second power state comprises:
  transitioning from the first power state to the second power state based at least in part on receiving a burst of downlink messages or one or more second control messages scheduling the burst of downlink messages, wherein satisfying the condition is based at least in part on receiving the end of the burst or receiving the one or more second control messages.

26. The method of claim 21, further comprising:
  transitioning from the second power state to the first power state based at least in part on expiration of a timer, wherein a duration of the timer is associated with the second power state.

27. The method of claim 21, further comprising:
  receiving a second control message indicating the second power state of the plurality of power states, wherein satisfying the condition is based at least in part on receiving the second control message.

28. The method of claim 21, wherein the second power state is activated for at least a first component carrier of a plurality of component carriers associated with the UE, and wherein the method further comprises:
  receiving a second control message indicating associations between the plurality of power states and the plurality of component carriers, wherein the second power state is activated for the at least first component carrier based at least in part on the second power state being associated with the at least first component carrier.

29. A non-transitory computer-readable medium storing code for wireless communications, the code comprising instructions executable by one or more processors to:
  receive a first control message indicating a plurality of power states, wherein each power state of the plurality of power states is associated with a configuration of a user equipment (UE);
  transition from a first power state of the plurality of power states to a second power state of the plurality of power states based at least in part on a condition being satisfied, wherein a first configuration of the UE associated with the first power state is different than a second configuration of the UE associated with the second power state, wherein the second power state is associated with a first power state pattern of a plurality of power state patterns; and
  activate, deactivate, or make dormant one or more component carriers of a plurality of component carriers associated with the UE based at least in part on the first power state pattern, wherein each power state of the plurality of power states is associated with one or more component carriers of the plurality of component carriers based at least in part on a power state pattern from the plurality of power state patterns.

* * * * *